Figure 2:
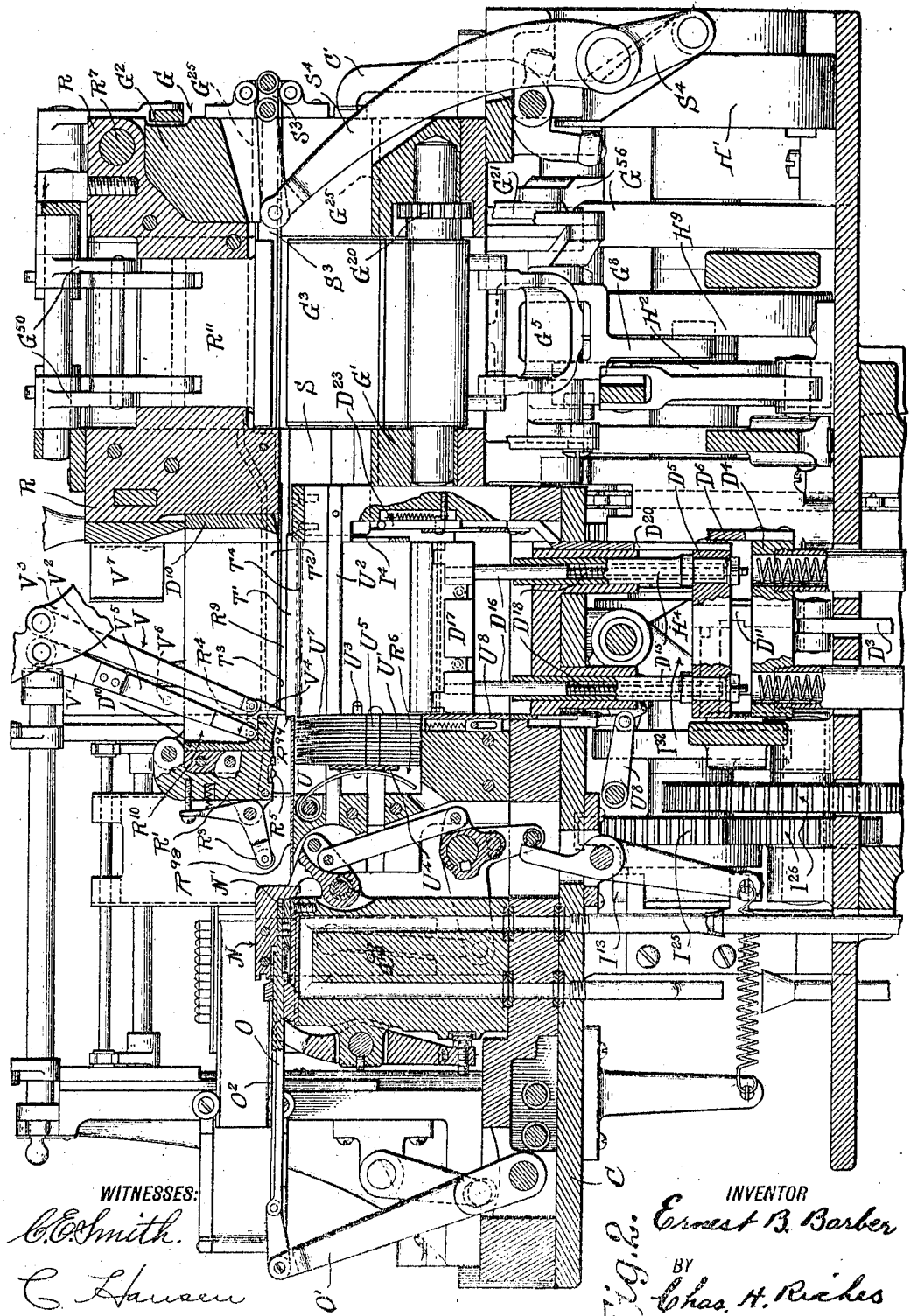

E. B. BARBER.
TYPOGRAPHIC MACHINE.
APPLICATION FILED FEB. 13, 1911.

1,054,489.

Patented Feb. 25, 1913.
21 SHEETS—SHEET 1.

Fig. 1.

WITNESSES:
C. E. Smith.
C. Hansen

INVENTOR
Ernest B. Barber
BY
Chas. H. Riches
ATTORNEY

E. B. BARBER.
TYPOGRAPHIC MACHINE.
APPLICATION FILED FEB. 13, 1911.

1,054,489.

Patented Feb. 25, 1913.
21 SHEETS—SHEET 4.

WITNESSES:
C. E. Smith.
C. Hansen.

INVENTOR
Ernest B. Barber
BY
Chas. H. Riches
ATTORNEY

E. B. BARBER.
TYPOGRAPHIC MACHINE.
APPLICATION FILED FEB. 13, 1911.

1,054,489.

Patented Feb. 25, 1913.
21 SHEETS—SHEET 8.

WITNESSES:
C. E. Smith.
C. Hansen

INVENTOR
Ernest B. Barber
BY
Chas. H. Riches
ATTORNEY

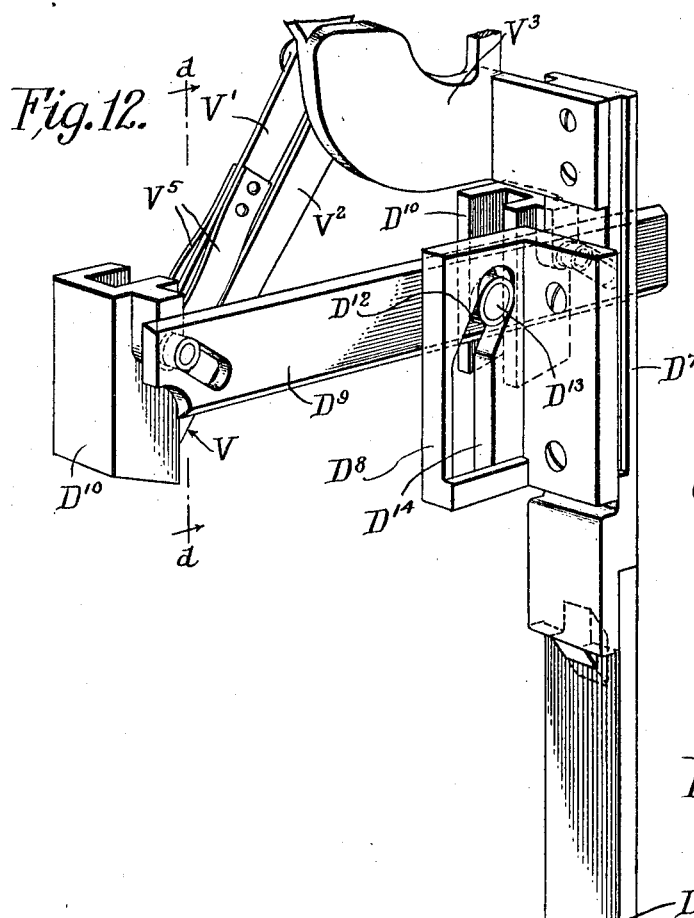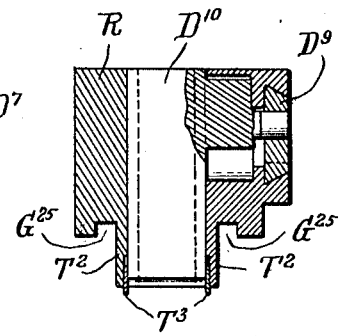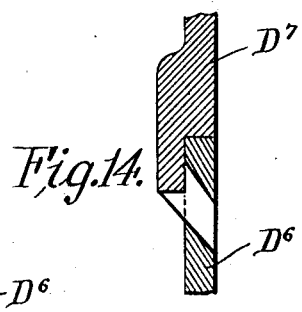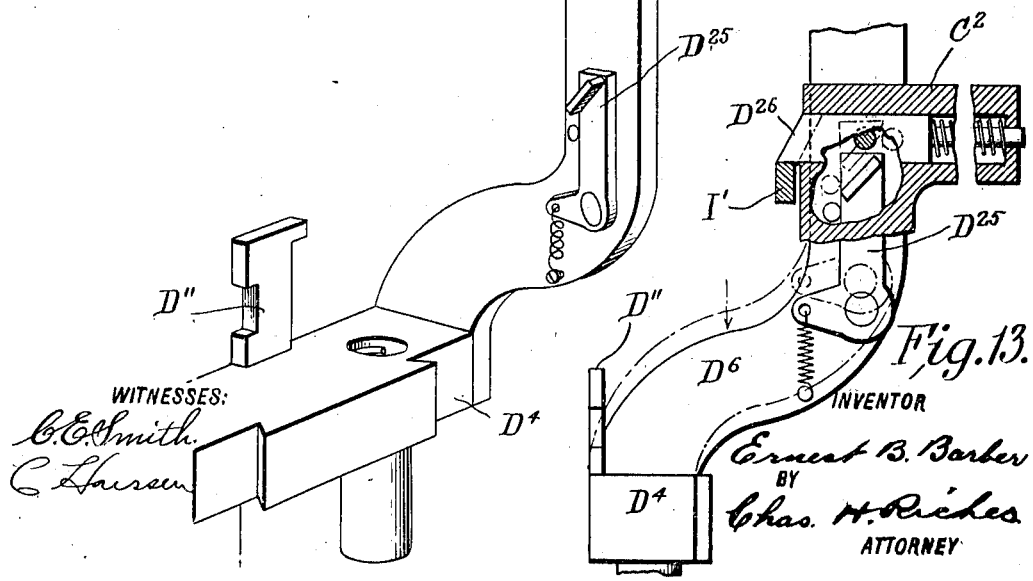

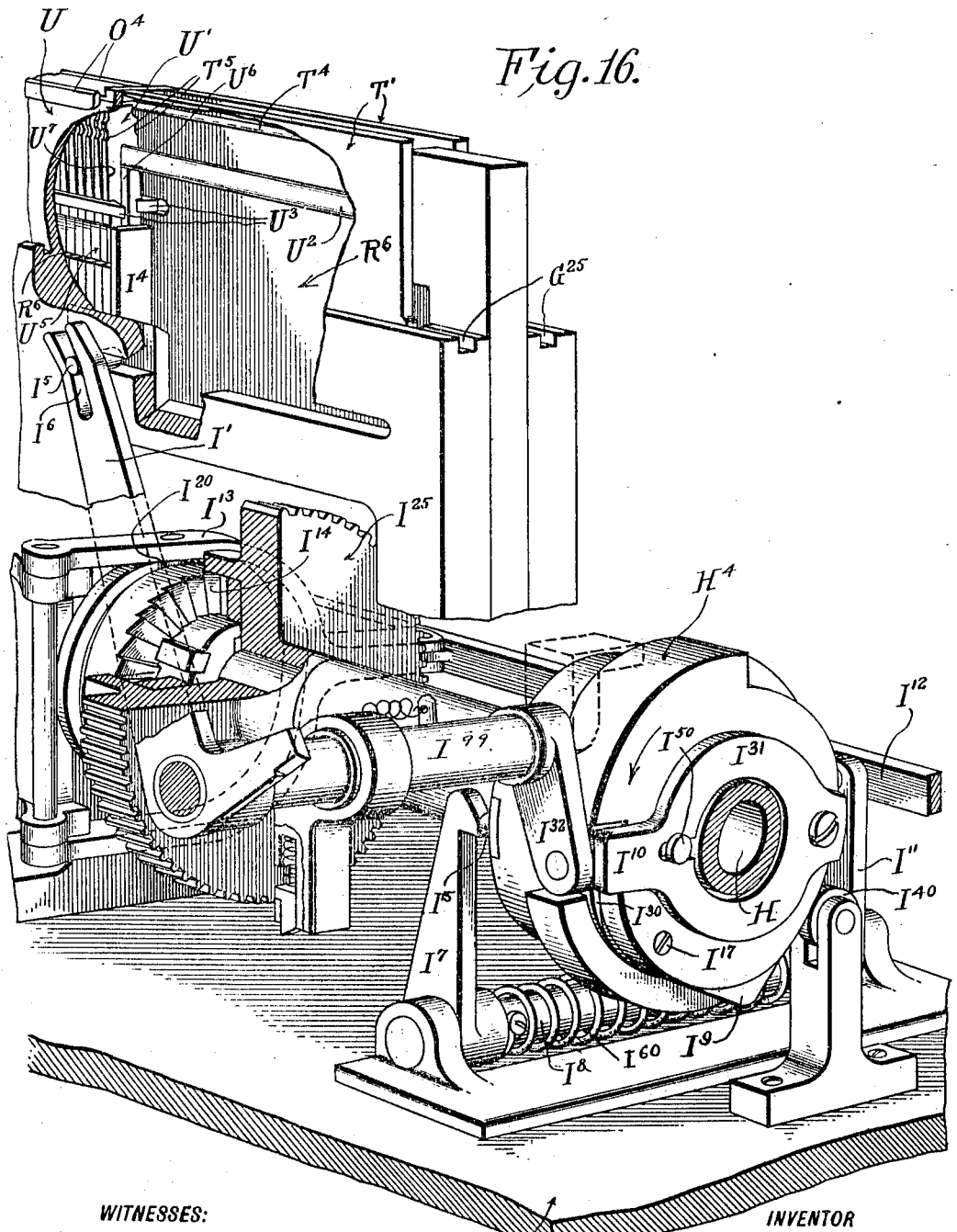

E. B. BARBER.
TYPOGRAPHIC MACHINE.
APPLICATION FILED FEB. 13, 1911.

1,054,489.

Patented Feb. 25, 1913.
21 SHEETS—SHEET 11.

WITNESSES:

INVENTOR
Ernest B Barber
BY
Chas H Riches
ATTORNEY

E. B. BARBER.
TYPOGRAPHIC MACHINE.
APPLICATION FILED FEB. 13, 1911.

1,054,489.

Patented Feb. 25, 1913.
21 SHEETS—SHEET 14.

WITNESSES:
C. E. Smith.
C. Hansen

INVENTOR
Ernest B. Barber
BY
Chas. H. Riches
ATTORNEY

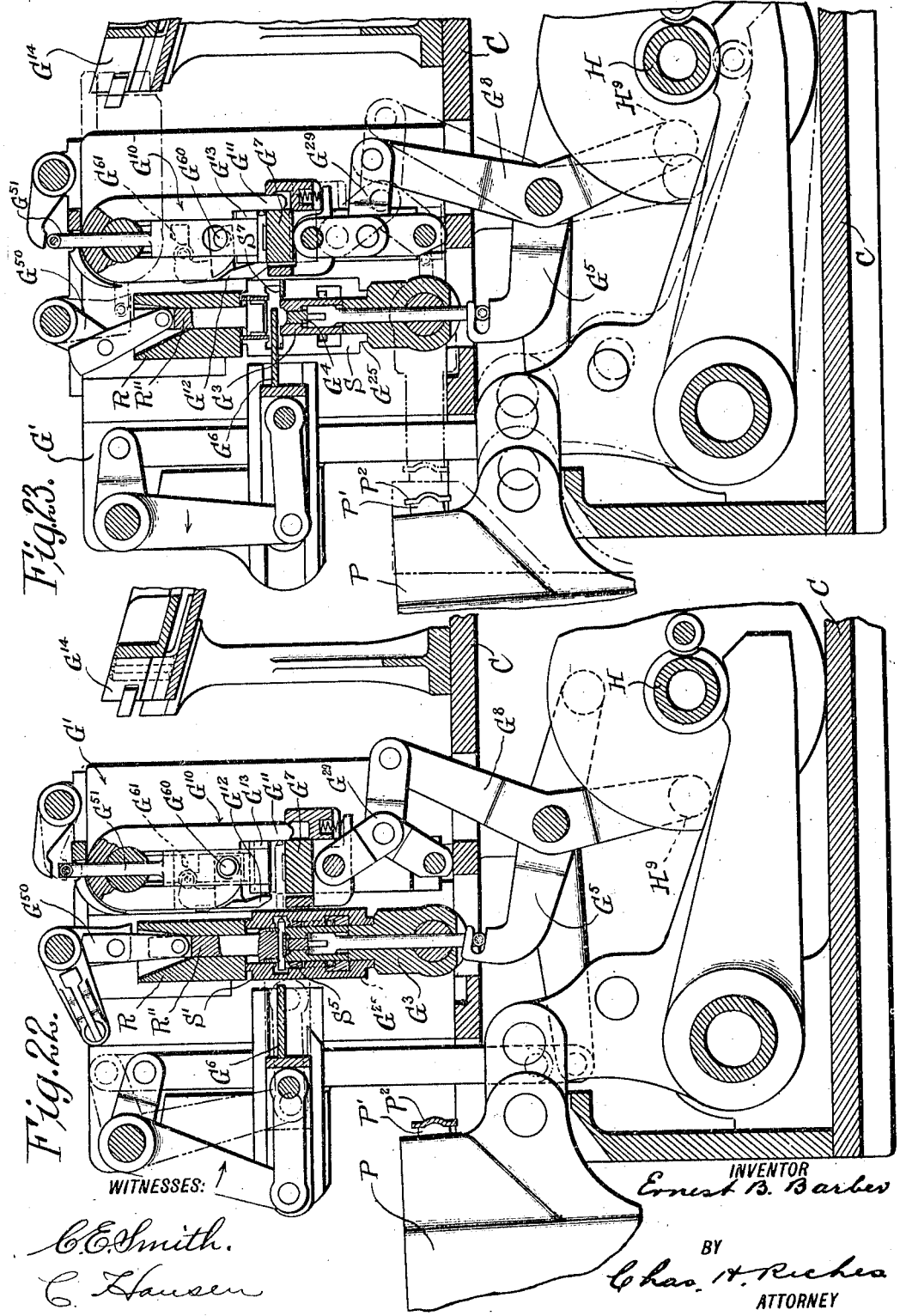

E. B. BARBER.
TYPOGRAPHIC MACHINE.
APPLICATION FILED FEB. 13, 1911.

1,054,489.

Patented Feb. 25, 1913.
21 SHEETS—SHEET 16.

WITNESSES:
C. E. Smith.
C. Hausen

INVENTOR
Ernest B. Barber
BY Chas. H. Riches
ATTORNEY

E. B. BARBER.
TYPOGRAPHIC MACHINE.
APPLICATION FILED FEB. 13, 1911.
1,054,489.
Patented Feb. 25, 1913.
21 SHEETS—SHEET 17.
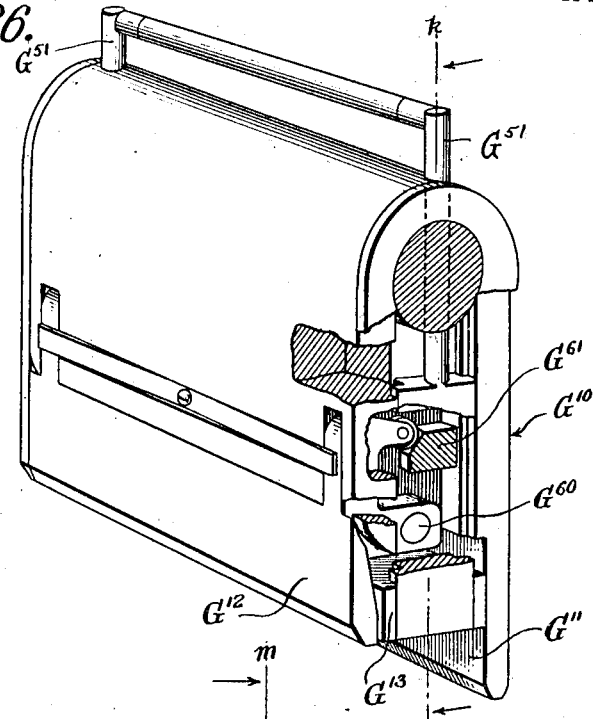
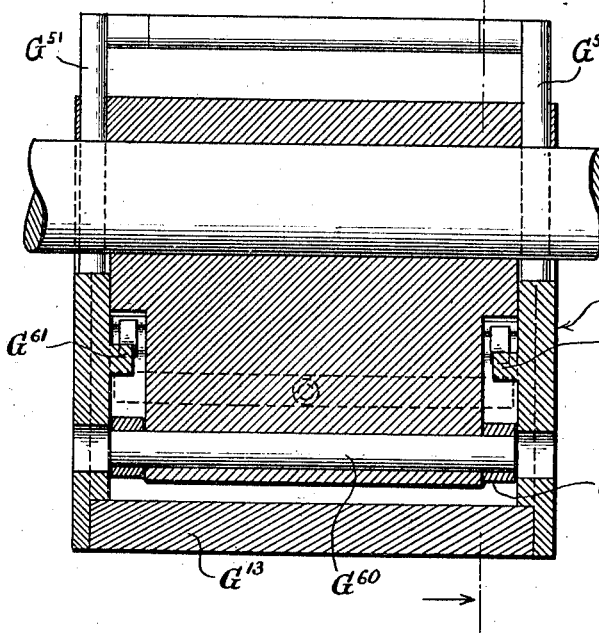
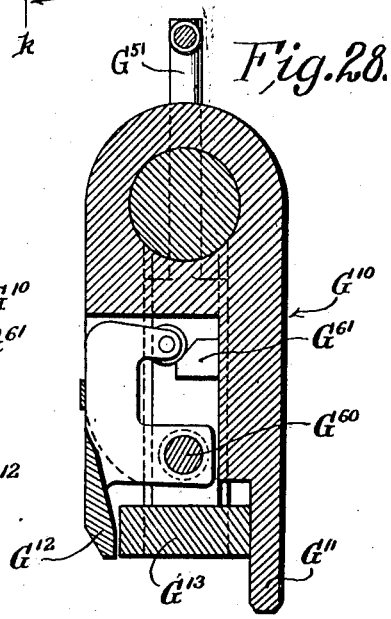
WITNESSES:
INVENTOR
Ernest B Barber
BY
Chas. H. Riches
ATTORNEY

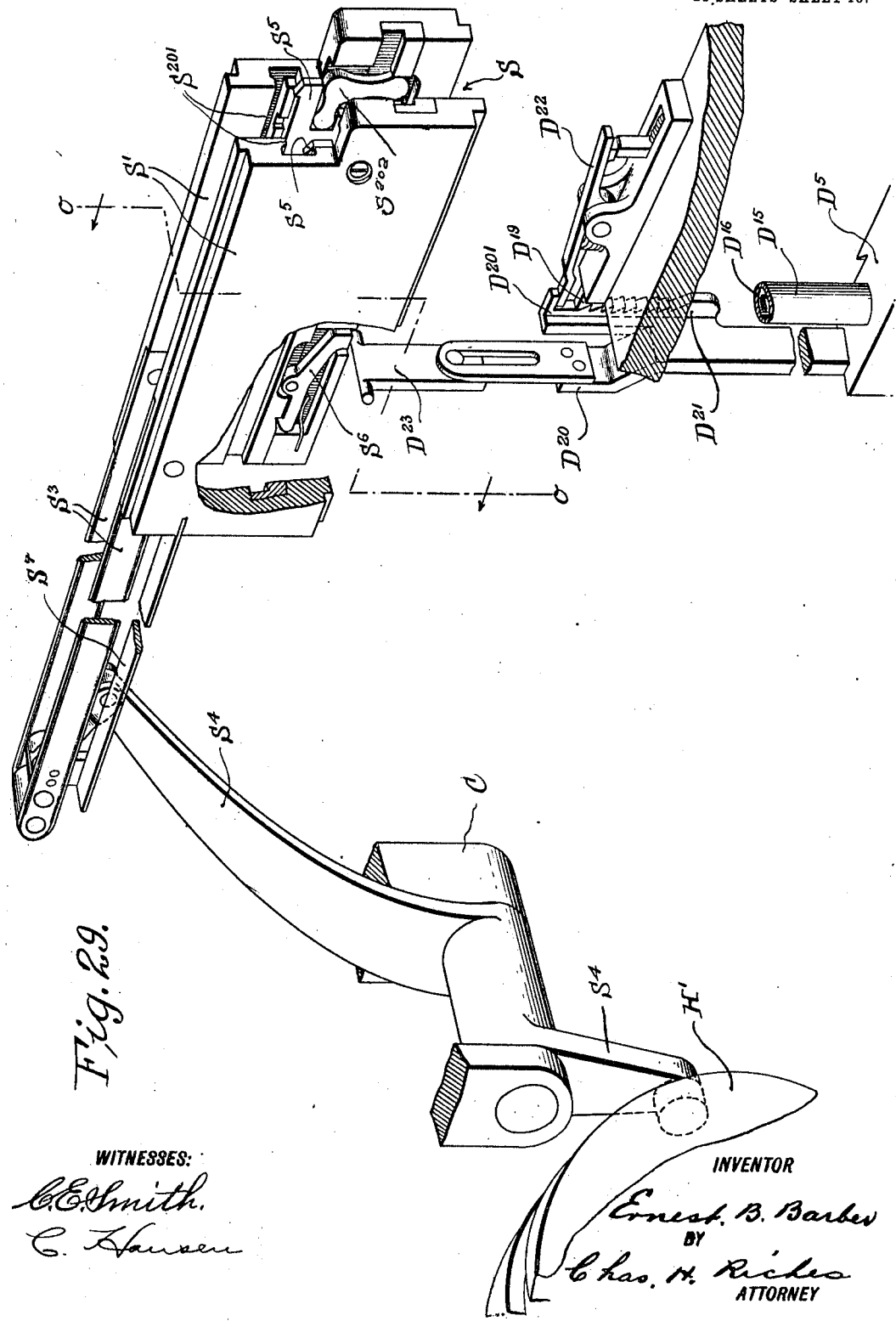

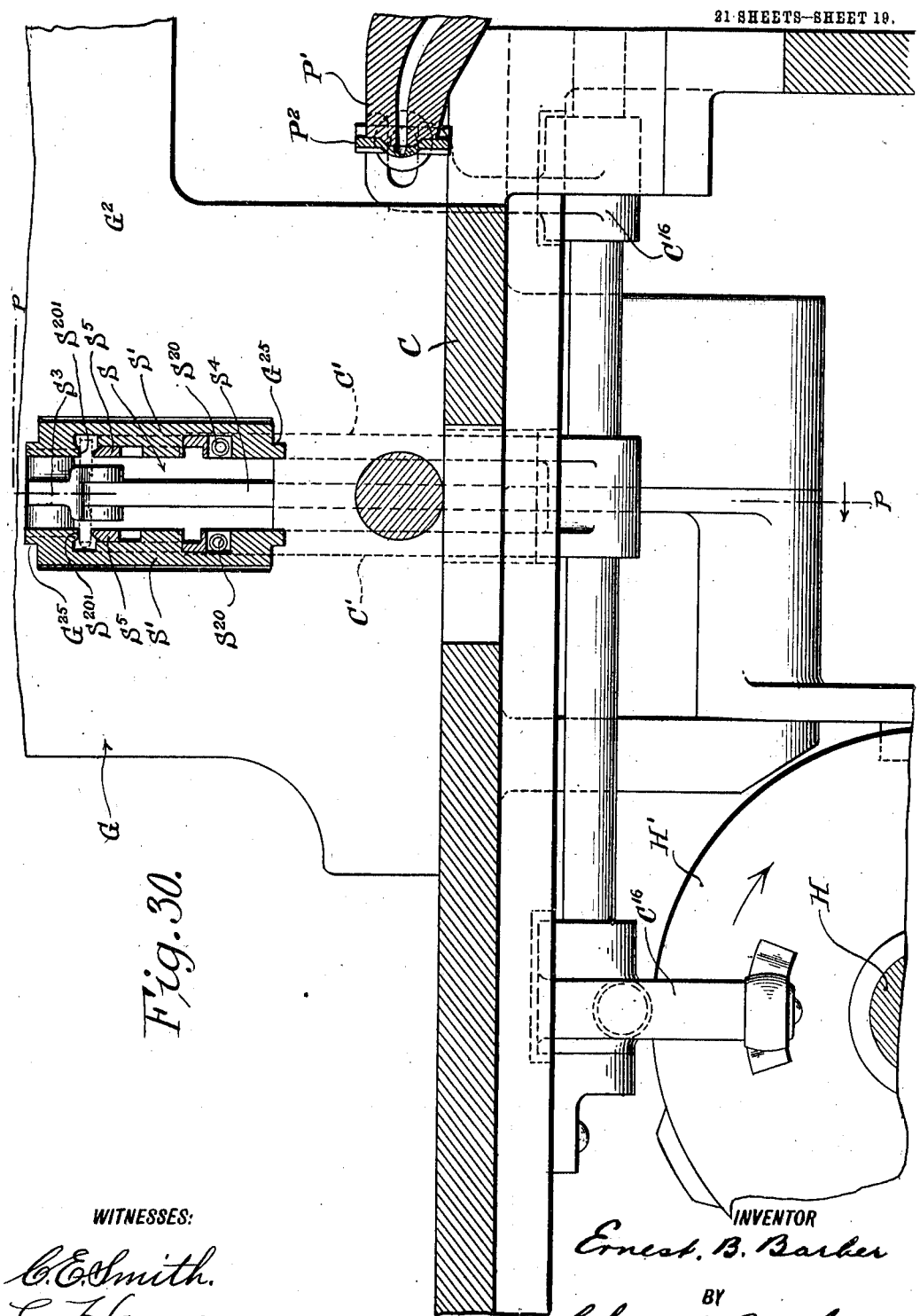

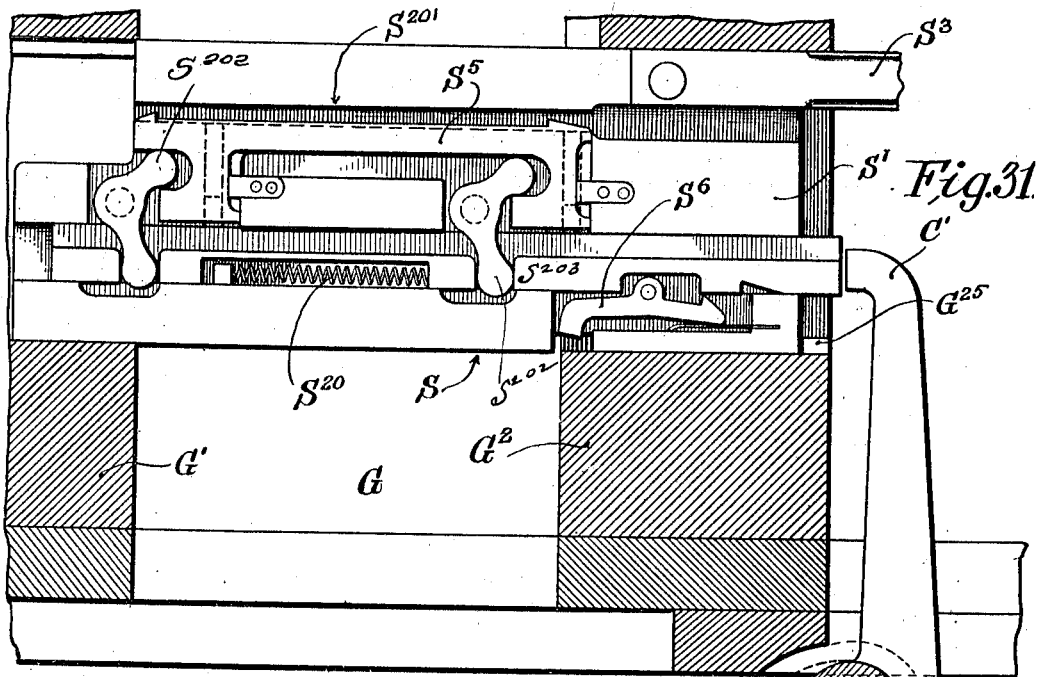
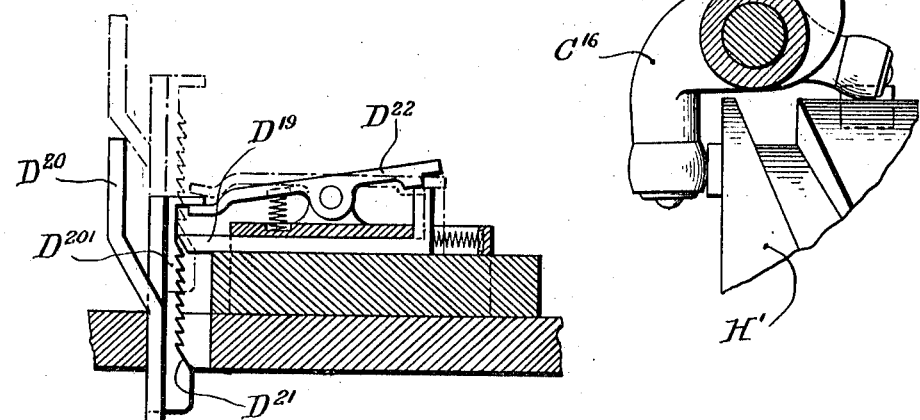
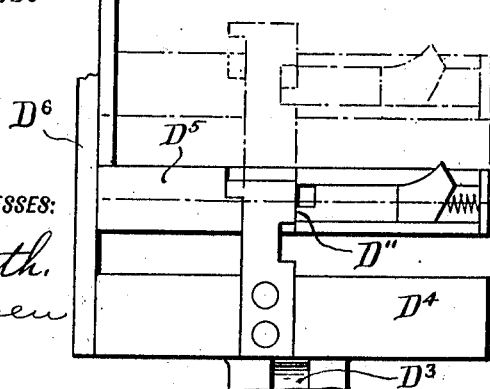

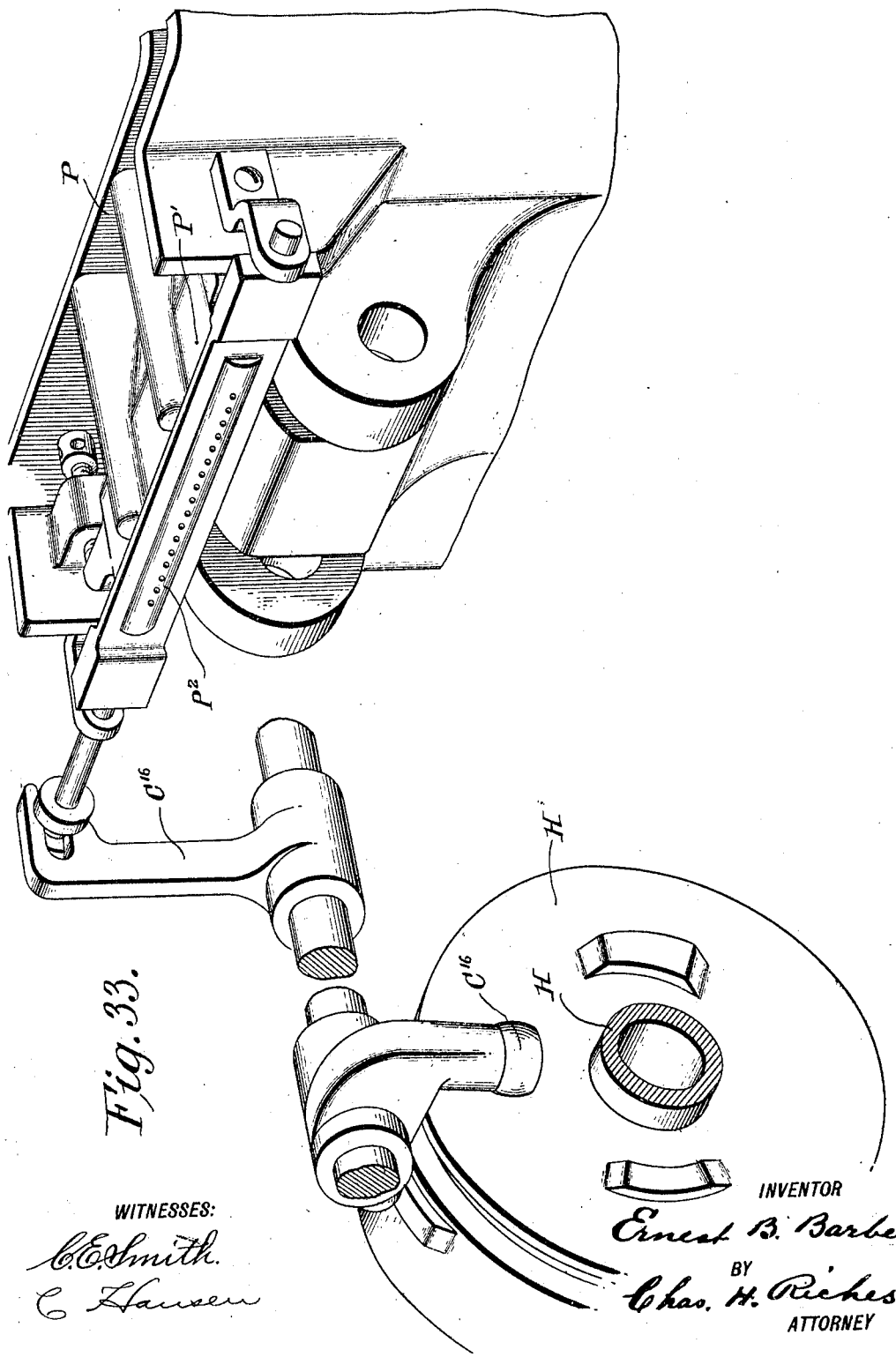

UNITED STATES PATENT OFFICE.

ERNEST BENJAMIN BARBER, OF BROOKLYN, NEW YORK, ASSIGNOR, BY MESNE ASSIGNMENTS, TO INTERNATIONAL TYPESETTING MACHINE COMPANY, OF NEW YORK, N. Y., A CORPORATION OF NEW YORK.

TYPOGRAPHIC MACHINE.

1,054,489.  Specification of Letters Patent.  Patented Feb. 25, 1913.

Application filed February 13, 1911. Serial No. 608,441.

*To all whom it may concern:*

Be it known that I, ERNEST BENJAMIN BARBER, British subject, residing in the borough of Brooklyn, county of Kings, city and State of New York, United States of America, have invented certain new and useful Improvements in Typographic Machines, of which the following is a specification.

In my Letters Patent of the United States Number 1,002,212, dated September 5th, 1911, and in my subsequent applications for Letters Patent, Serial Numbers 564,289 and 564,290, filed May 31st, 1910, I have shown and described mechanism for casting types with locking grooves intermediate their ends, assembling these types side by side into a line in the order of their production, introducing tapered word-spacers between them as they are assembled, justifying the line by advancing the spacers and spreading the word-spaced types to pre-determined limits, locking the types in their justified condition, and withdrawing the spacers from the line and returning them to the space magazine, the description of such mechanism terminating with the locking of the line of type in its justified condition in the line carriage. I have now completed the construction of the mechanism for amalgamating these justified types into a composite line, i. e., for taking the types locked in their justified condition within the line carriage and introducing into the grooves of the types a locking strip of type metal, swaging the locking strip and types together until they form a composite line, and then delivering the composite line to a galley.

My machine as now completed may be termed "a machine of continuous operation," and by it, an operator is enabled, to produce a word-spaced line of desired characters, to justify the line by advancing the spacers between the types and spreading them to the pre-determined limits, to lock the line in its justified condition, to withdraw the spacers and return them to the space magazine, to transfer the line carriage with its justified line to the amalgamating mechanism, to introduce the locking strip into the locking grooves of the type, and then swage-lock the locking strip and types together into a composite or amalgamated line, to deliver the composite line to the galley, and to cast the locking strip for the succeeding line, the operator proceeding with the casting of the types for the succeeding line while the preceding line is being amalgamated.

Figure 3:
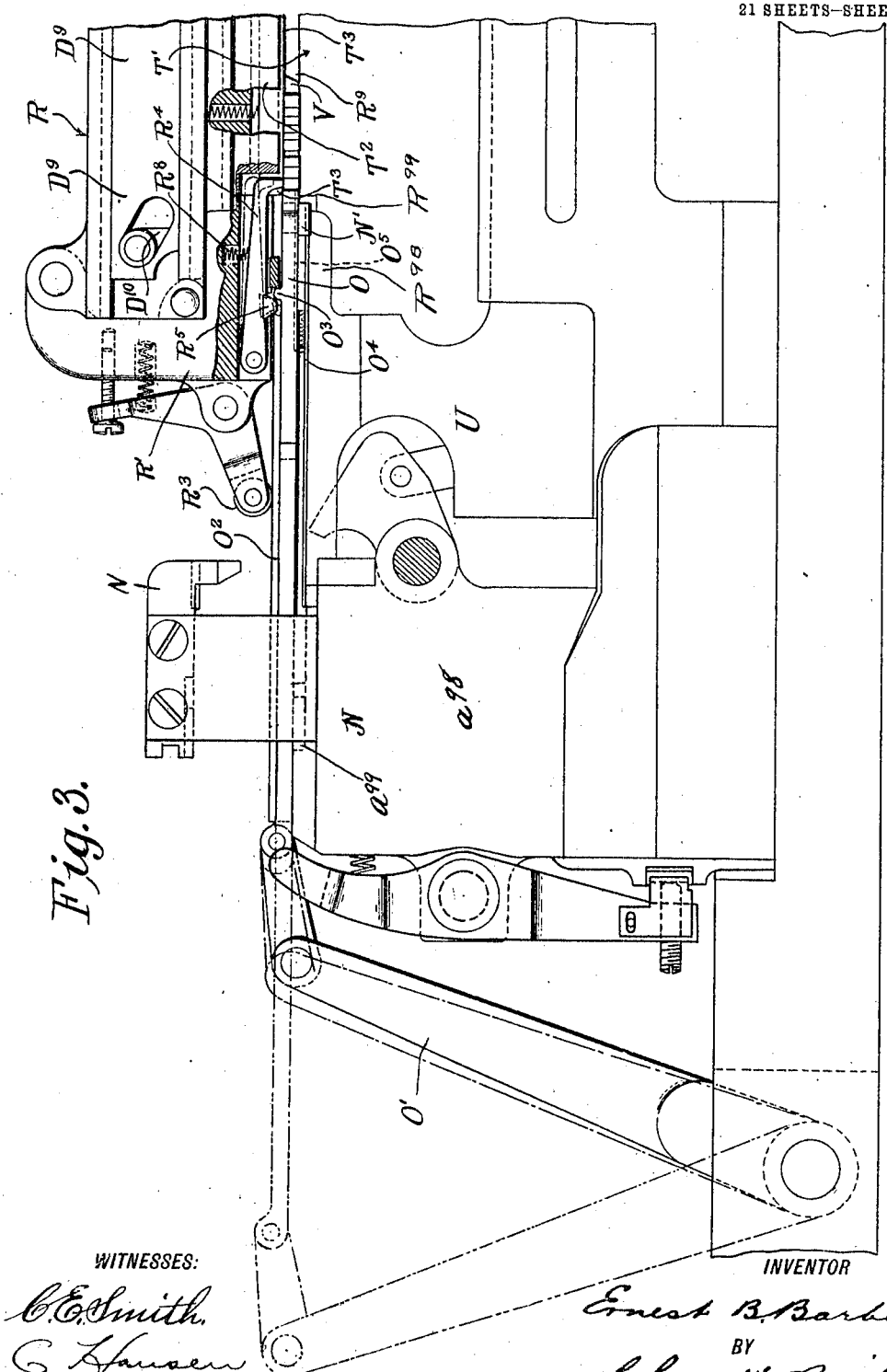
Figure 4:
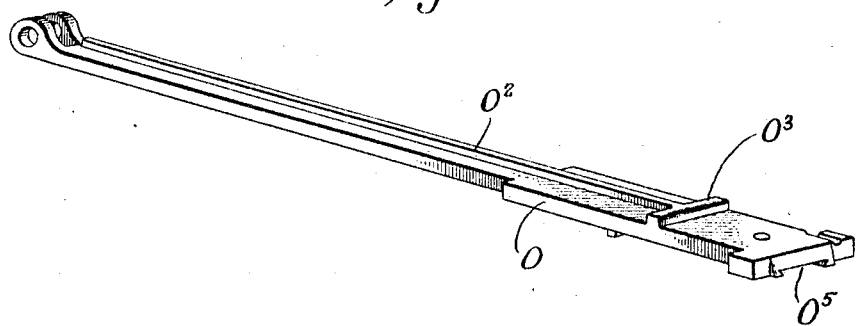
Figure 5:
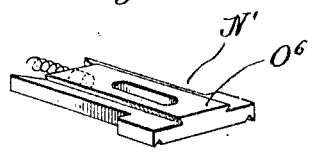
Figure 6:
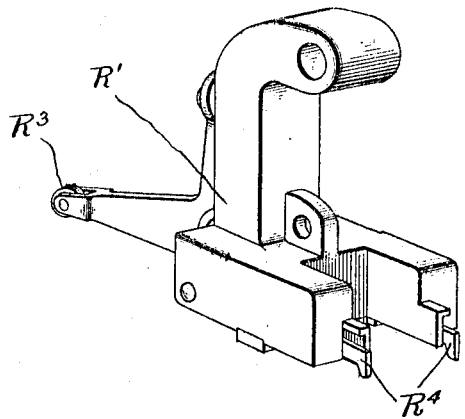
Figure 7:
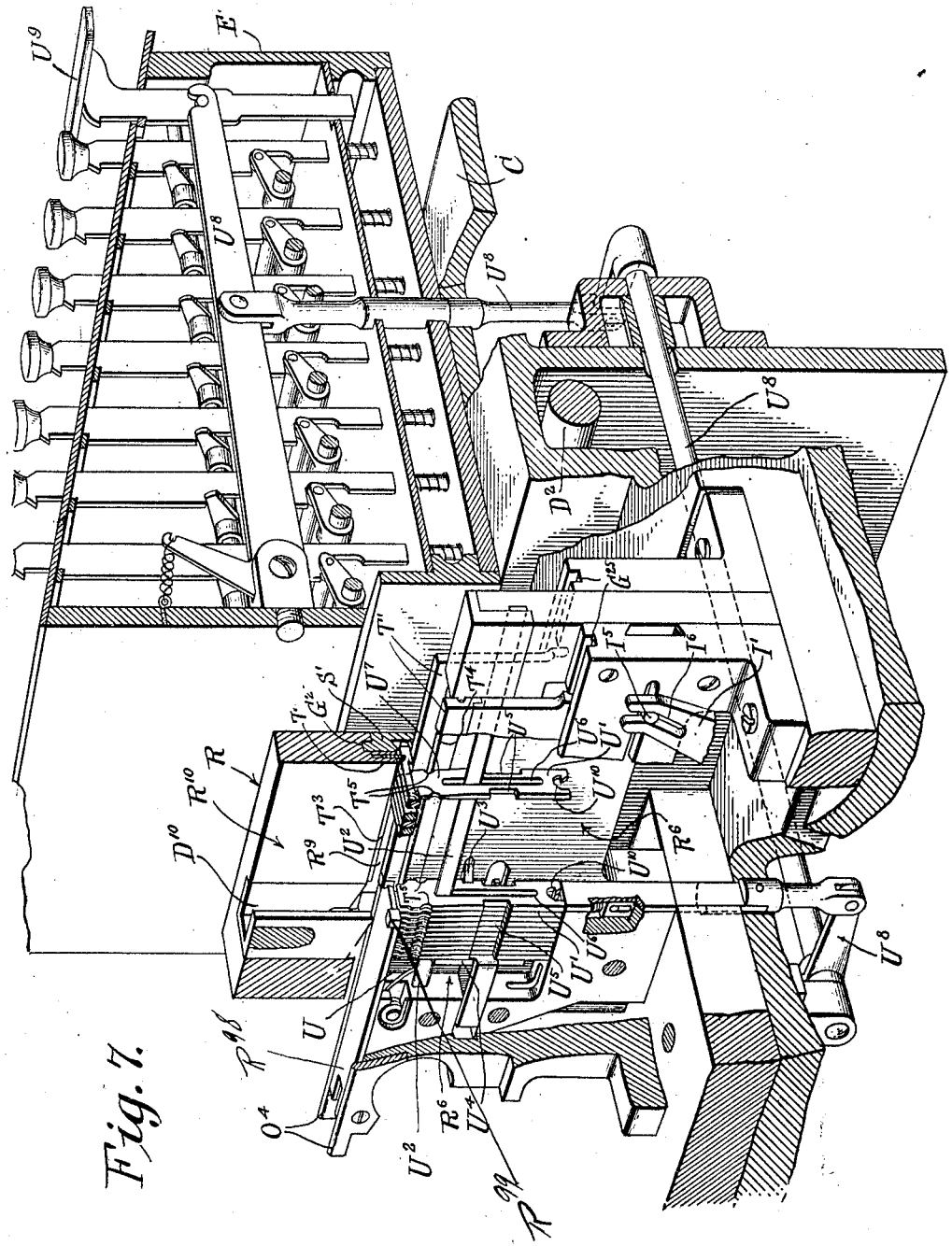
Figure 8:
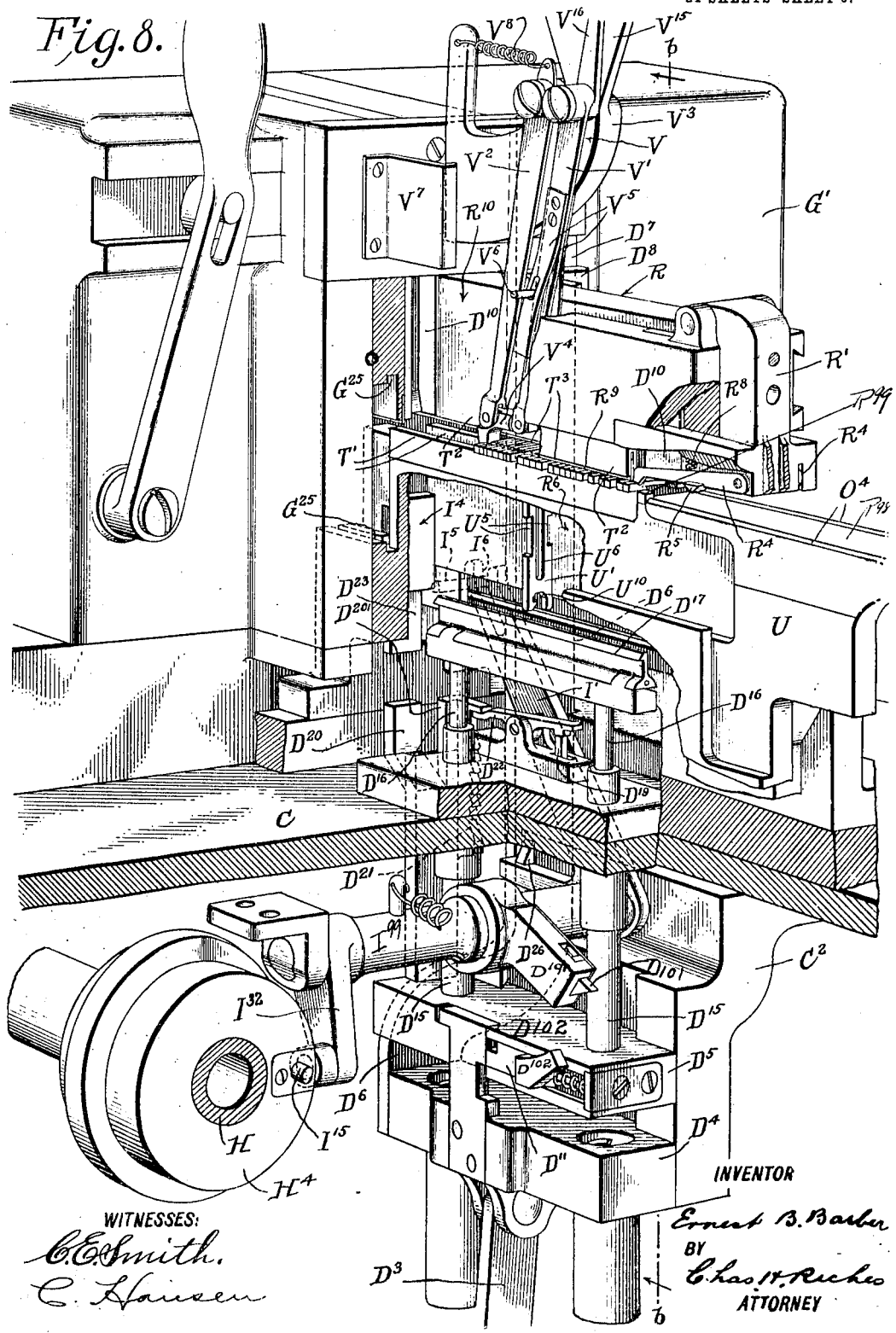
Figure 9:
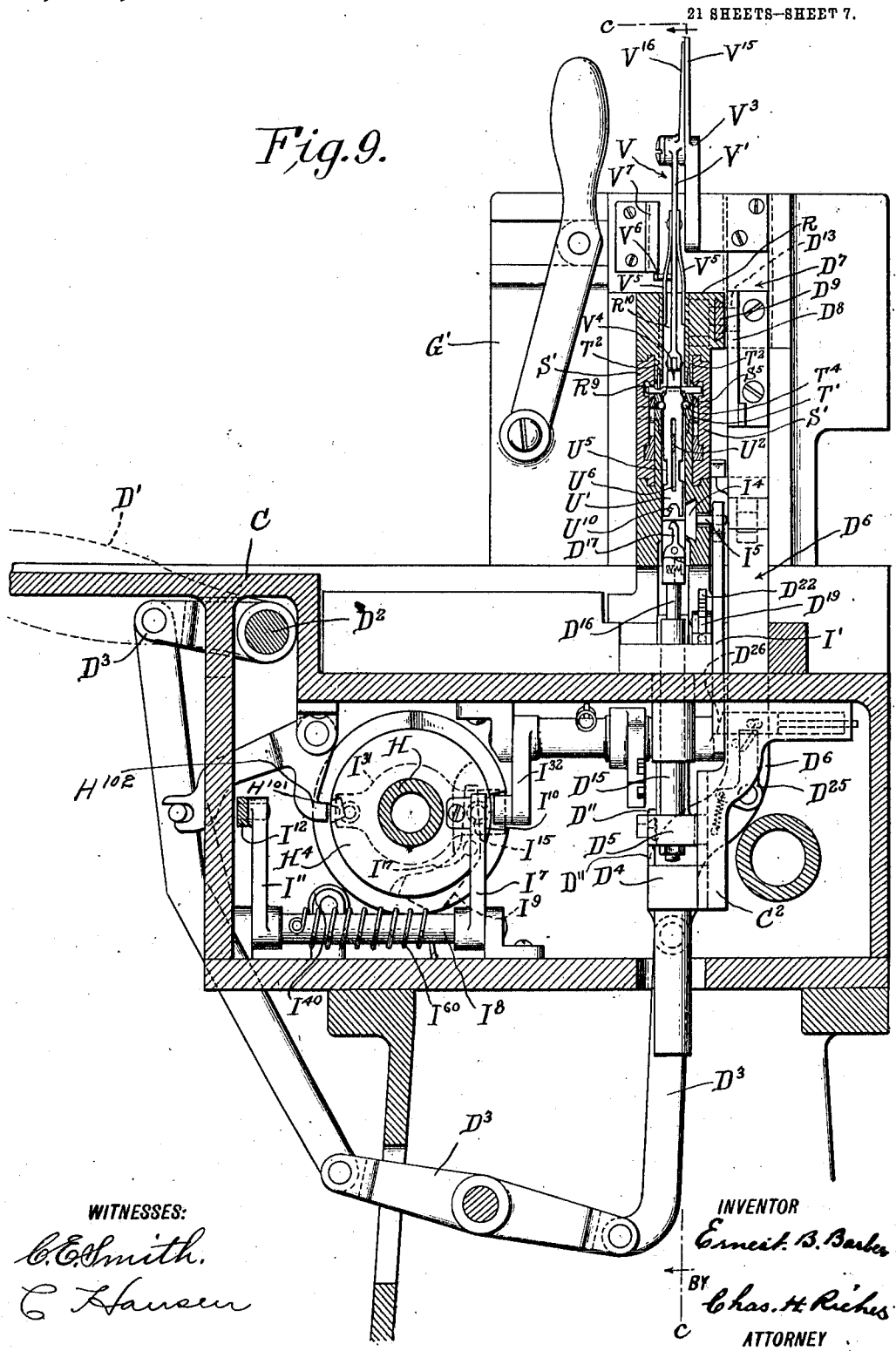
Figure 10:
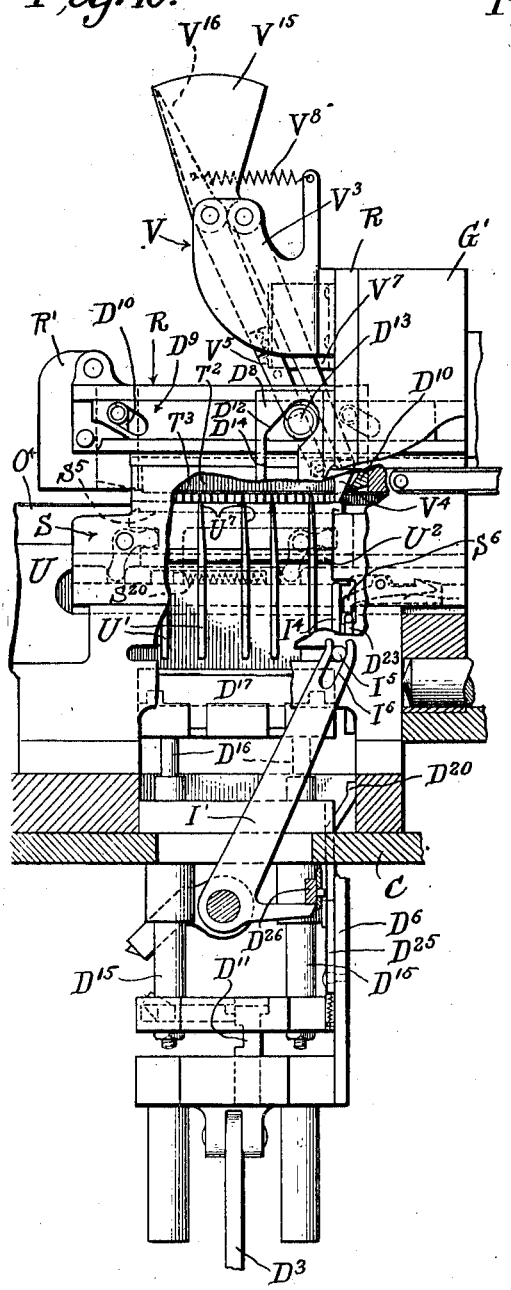
Figure 11:
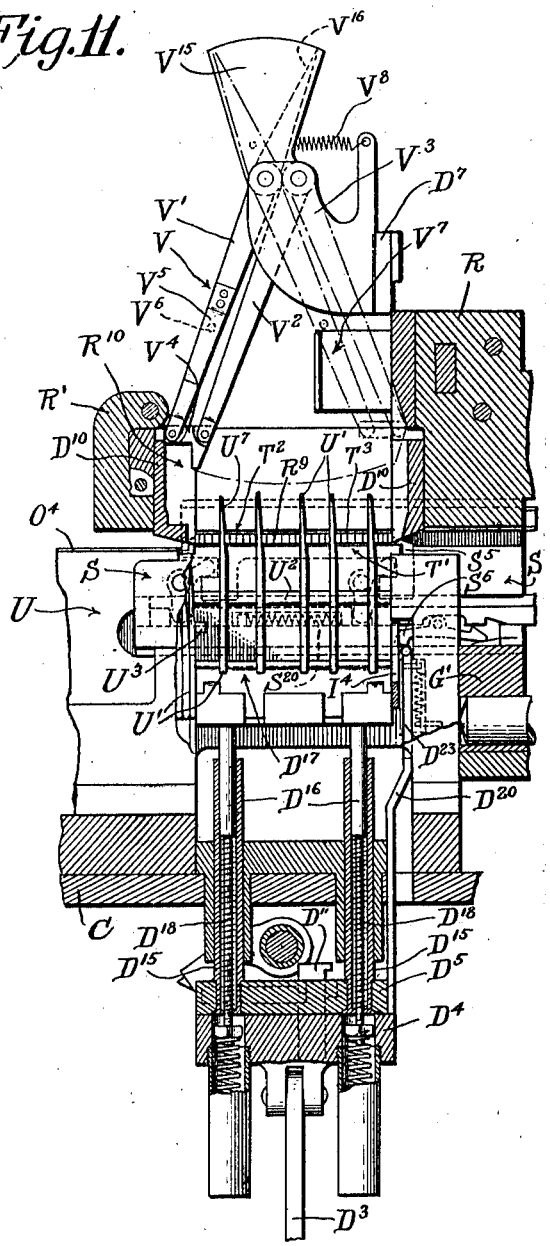
Figure 17:
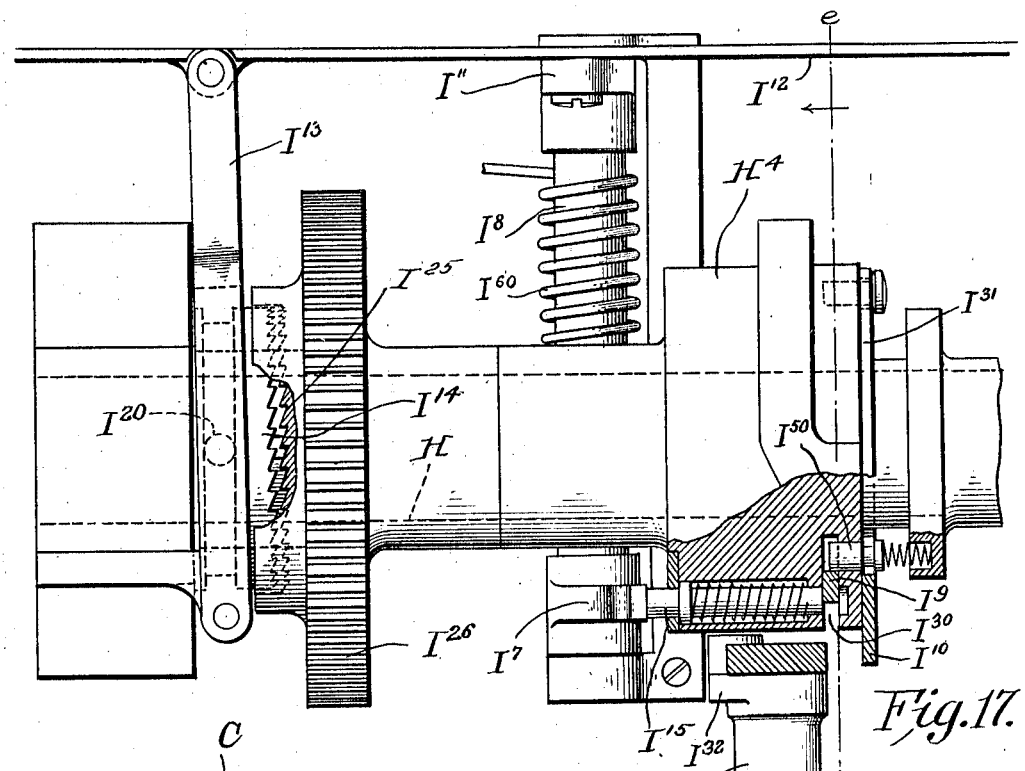
Figure 18:
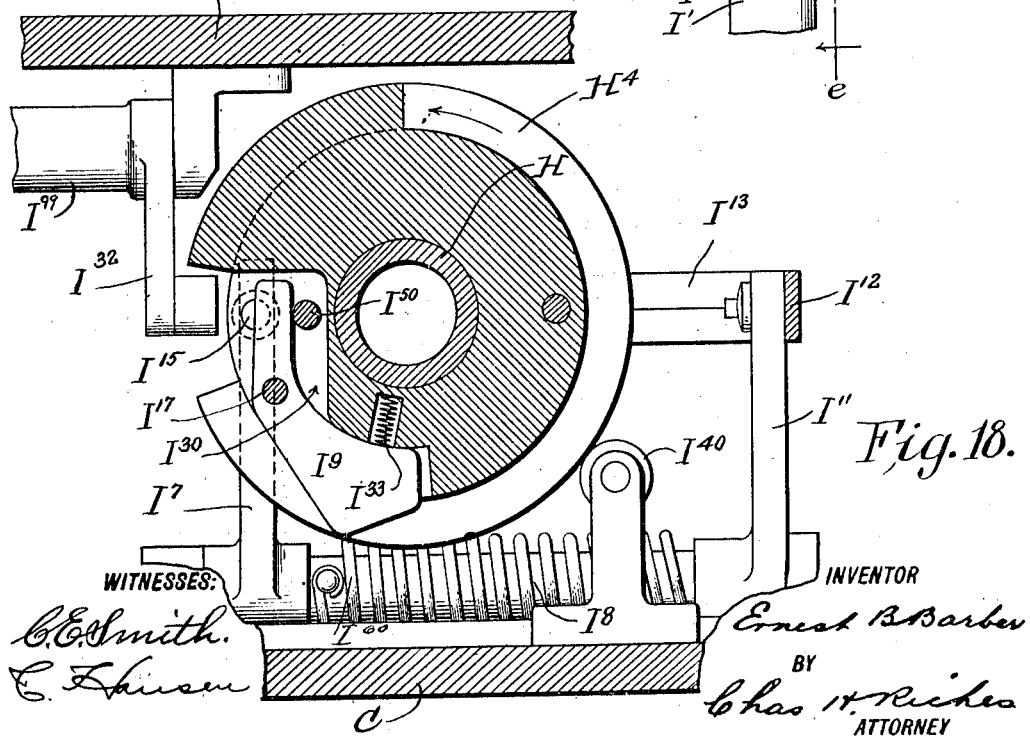
Figure 19:
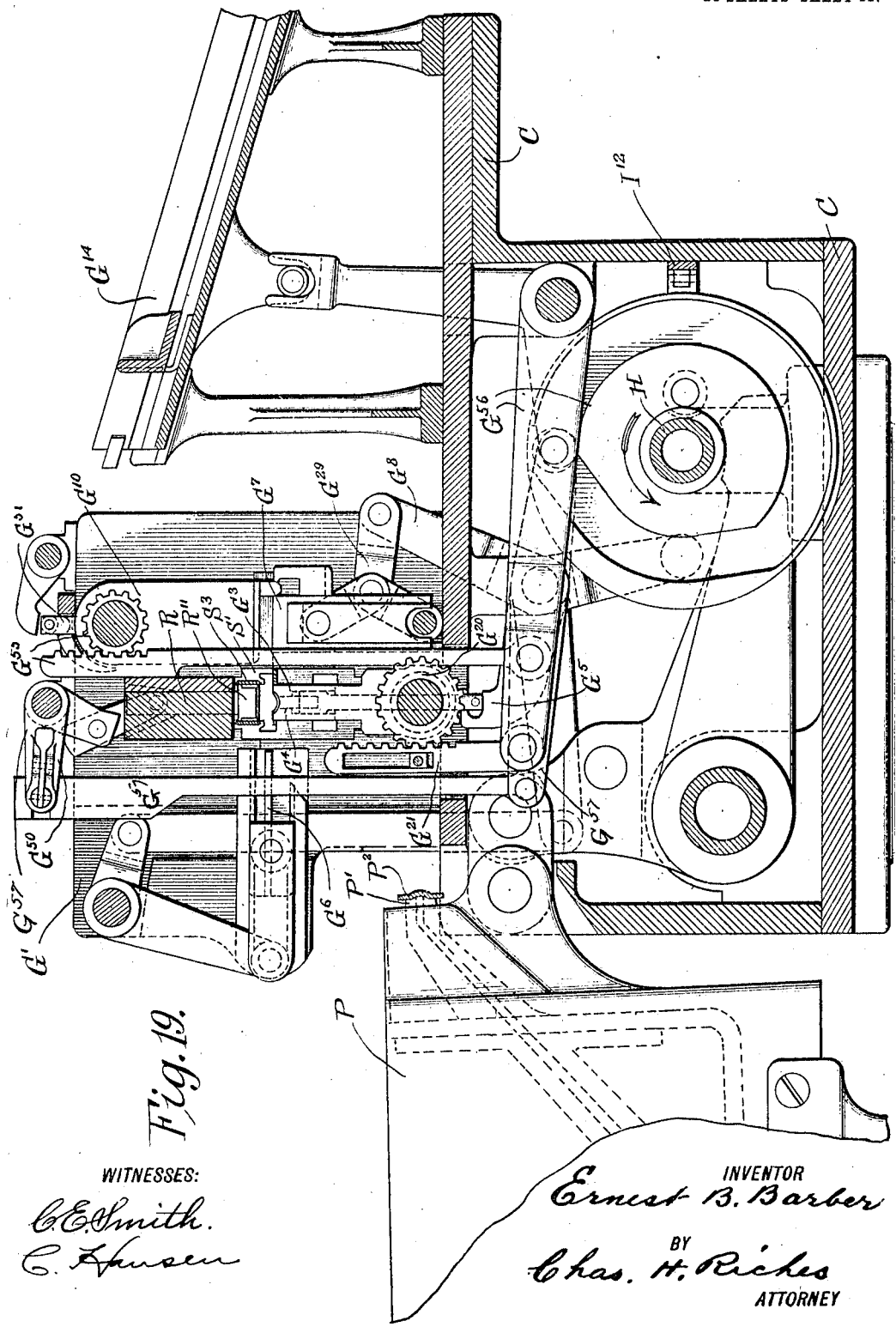
Figure 20:
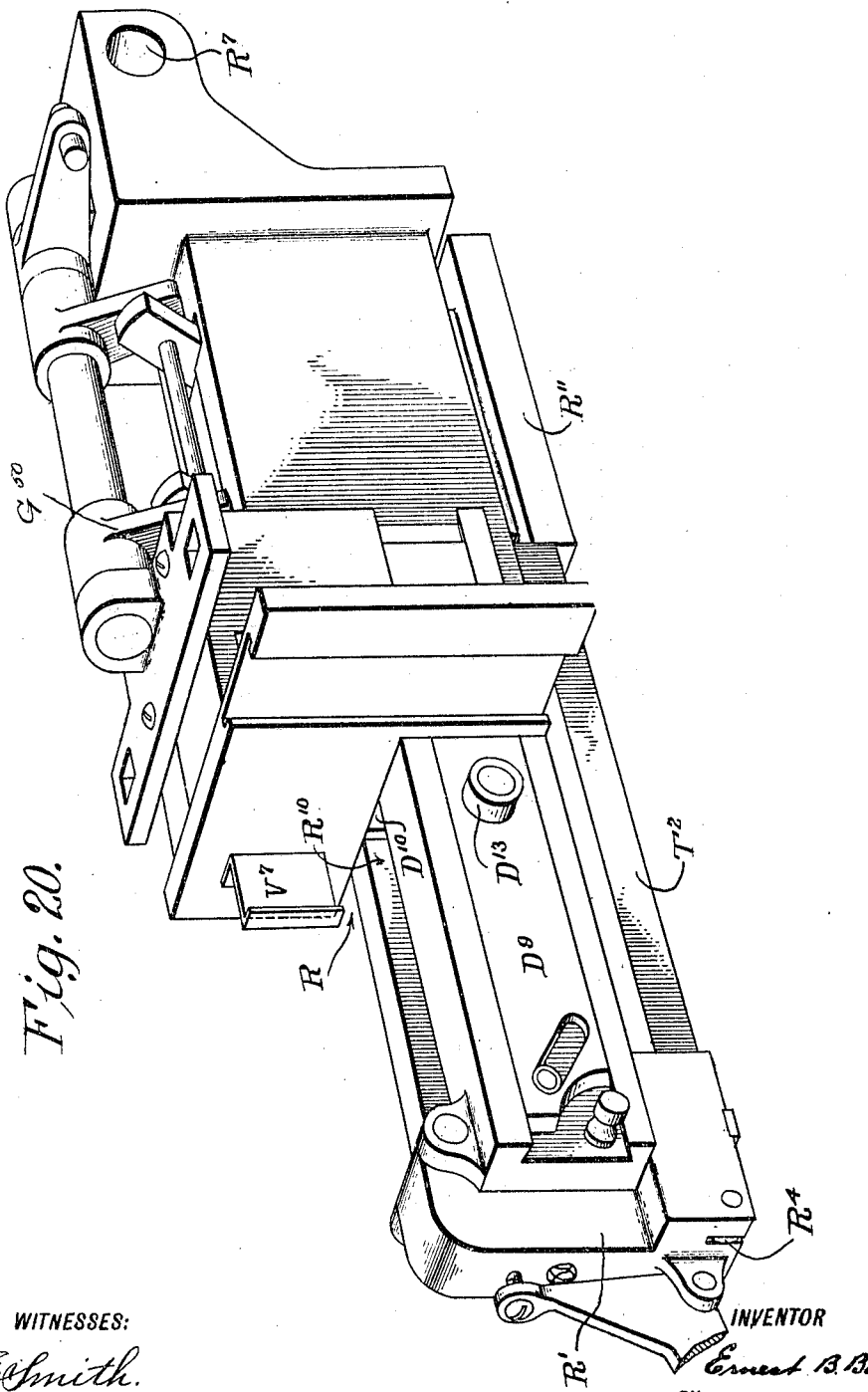
Figure 21:
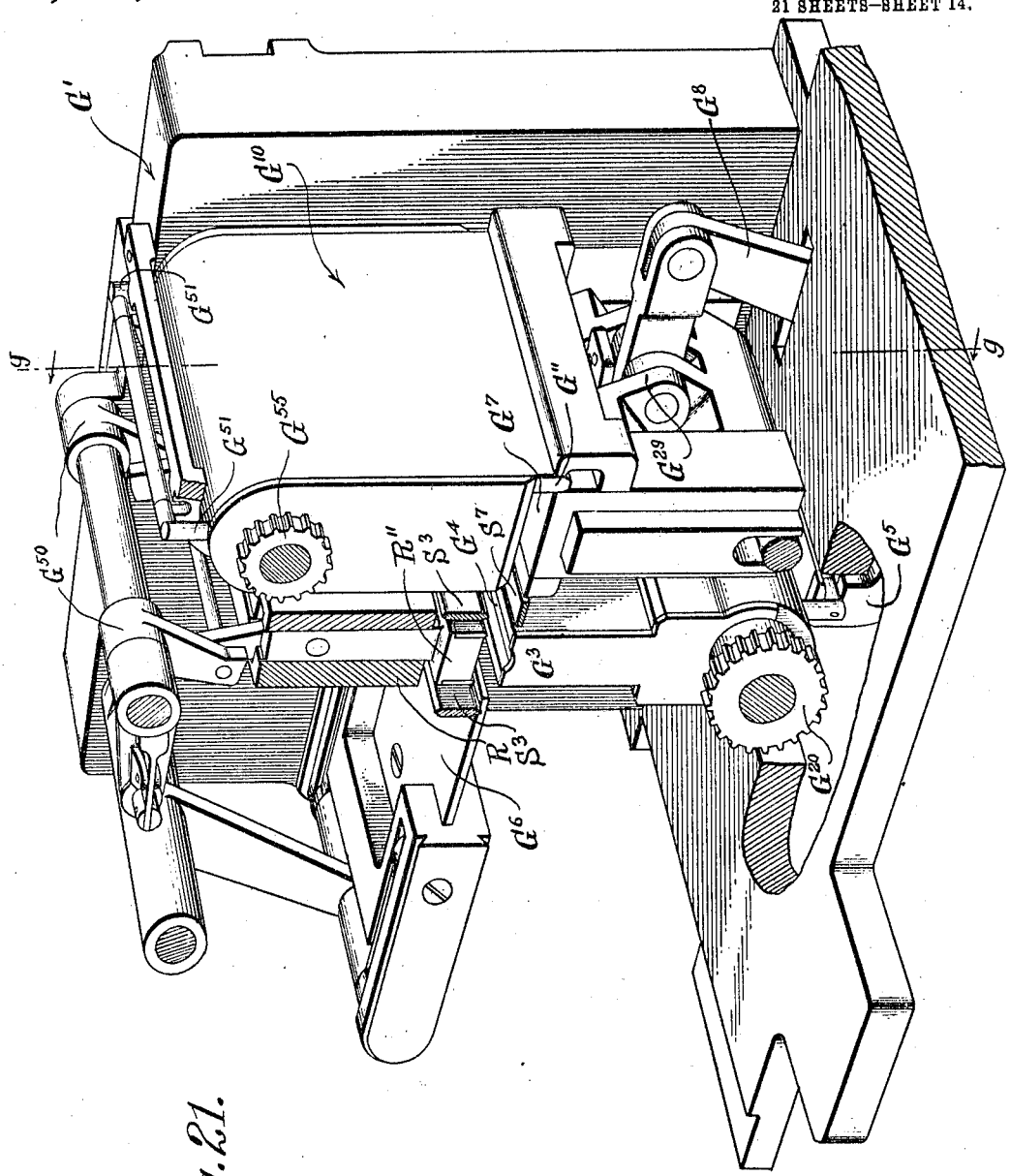
Figure 24:
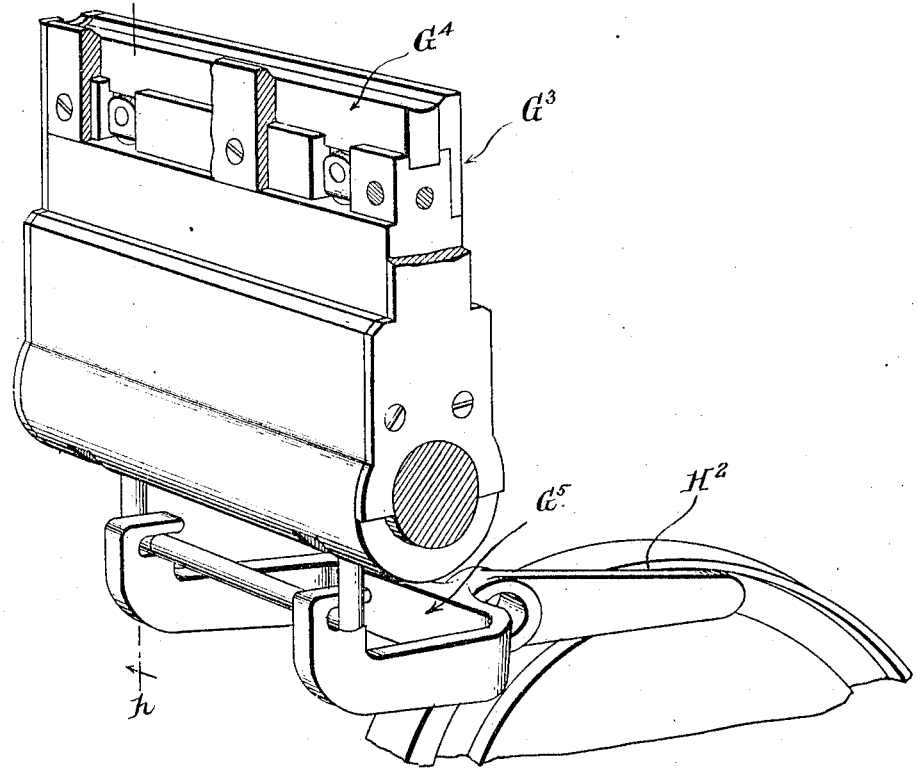
Figure 25:
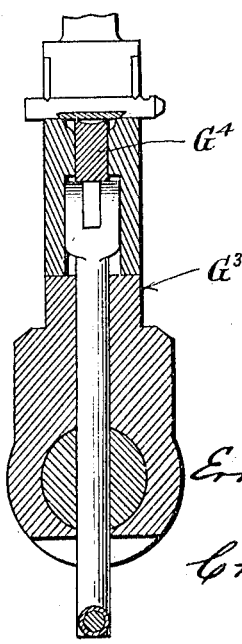

In the drawings:—Figure 1 is a plan view of the type casting machine one fourth full size. Fig. 2 is a vertical section of the type casting machine, one half full size on the line a—a Fig. 1. Fig. 3 is side elevation of part of the type producing and assembling mechanisms showing the delivery of a type into an assembling line. Fig. 4 is a perspective view of the ejector. Fig. 5 is a perspective view of the movable mold slide. Fig. 6 is a perspective view of the assembling pawl holder. Fig. 7 is a perspective view partly in section, showing the type assembly, the space magazine, spacers and space actuating mechanism. Fig. 8 is a perspective view partly in section showing the type assembly, spacing, justifying, amalgamating, and controlling mechanisms, and the line supporting apparatus. Fig. 9 is a vertical section on the line b—b Fig. 8. Fig. 10 is a vertical elevation, partly in section, showing the type assembly, with spacers introduced into the assembling line, the means for returning the spacers to the space magazine, the justifying mechanism, and the line supporting apparatus, the parts being in their relative positions preparatory to the justification of the line. Fig. 11 is a vertical section on the line c—c Fig. 9 of the same parts as shown in Fig. 10 with the spacers advanced to spread the type to the limits of the line and the line supporting apparatus in its elevated position. Fig. 12 is a perspective view of part of the means for actuating the line holding jaws, and the line supporting apparatus. Fig. 13 is a view of the lower end of the upright bar shown in Fig. 12, with its related parts in section to show the locking control for the space return mechanism. Fig. 14 is a section through the joint formed by the upper and lower parts of the upright bar shown in Fig. 12. Fig. 15 is a section on the line d—d Fig. 12. Fig. 16 is a perspective view partly in section, showing the space return mechanism, and part of the starting and stopping mechanism. Fig. 17 is a plan view partly in section of the starting and stopping mechanism shown in Fig. 16 with the parts in their normal position. Fig. 18 is a section on the line e—e Fig. 17. Fig. 19 is a vertical section through the amalgamating mechanism. Fig. 20 is a perspective view of the hinged member. Fig. 21 is a perspective view partly in section of the amalgamating mechanism. Fig. 22 is a vertical section on the line g—g Fig. 21 showing the position of the parts during the introduction of the locking strip into the type grooves. Fig. 23 is a similar view to Fig. 22 showing the position of the parts after the delivery of the line to the compressor table. Fig. 24 is a perspective view of the locking strip mold. Fig. 25 is a vertical section on the line h—h Fig. 24. Fig. 26 is a perspective view partly in section of the amalgamator. Fig. 27 is a vertical section on the line k—k Fig. 26. Fig. 28 is a vertical section on the line m—m Fig. 27. Fig. 29 is a perspective view of the line carriage and the line carriage tripping mechanism. Fig. 30 is a section on the line o—o Fig. 29, with the line carriage in the amalgamating mechanism. Fig. 31 is a section on the line p—p Fig. 30, showing the means for unlocking the line carriage plates. Fig. 32 is a view partly in section showing the safety means for controlling the starting lever. Fig. 33 is a perspective view of the locking strip mold showing the stripper plate and actuating means.

*Type and delivery.*—In my said patent Number 1,002,212, I have shown and described the means of producing types by the operations of a keyboard, a two-way moving matrix plate, and an automatically adjustable type mold, and the delivery of the types in the order of their production to an assembling line at which point the description of my present improvement begins. The ejector O is constructed and operated substantially as described in my said Patent 1,002,212, and is slidably attached to the movable mold side N', to determine the type body size. The mold N consists of a mold supporting structure $a^{98}$, the movable part N' forming one side of the mold, the free end of the ejector O forming another mold side, and the mold cap n forming the other two sides. The mold supporting structure $a^{98}$ is provided with an abutment $a^{99}$ to arrest the movable mold side N' when returned to its normal position upon the mold structure, as hereinafter described. (See Fig. 2.)

The movable mold side N' is formed with a dovetail core $O^6$ on its top surface, and the ejector O is formed with a dovetail groove $O^5$ in its bottom surface to receive the dovetail core $O^6$. This construction forms a sliding connection between the ejector and movable mold side and permits of the united movement of the ejector and movable mold side from the mold to the place of type assemblage, and the independent movement of the ejector when the movable mold side is arrested. (See Figs. 4 and 5.)

When the type is cast the parts of the mold unlock, the mold cap is lifted above the path of the type, and the ejector O is actuated to deliver the type from the casting position to the place of type assemblage, these motions of the various parts being described in my said Patent 1,002,212 and application 564,290. When the parts of the mold are unlocked and the mold cap is raised above the path of the type, the ejector O and the movable mold side N' carrying the type, are moved by the ejector lever O' from the mold supporting structure $A^{98}$ along the V-shaped guide rails $O^4$ and under an overhanging part R' termed "assembling pawl holder" for the delivery of the type to the lower rails T' of the type assembling chamber $R^9$, against which it is frictionally held by the false rails $T^3$, the movable mold side N' being arrested at approximately the place of type assemblage by abutments $R^{99}$ on the cover $R^{98}$ of the space magazine U, the ejector O then continuing its movement with the type independently of the movable mold side until the type is struck from the ejector O by two spring-pressed type assembling pawls $R^4$. (See Figs. 2 and 3.) The ejector O and the movable mold side N' then return to their normal position in the mold N, the return movement of the movable mold side being correctly arrested on the mold supporting structure $A^{98}$ by the abutments $A^{99}$.

To the assembling pawl holder R' is pivoted a friction wheel $R^3$ which by engaging the longitudinal rib $O^2$ on the top of the ejector O, raised to or above the level of the type, prevents the movable mold side N' leaving the guide rails $O^4$ in its rapid flight to and from the mold and thus maintains the ejector and movable mold side, which constitute the type delivering means, in a fixed path during their movements to and from the casting position, and insures the safe carriage of the type to its place of delivery, so that when the ejector has pushed it into the assembling line, it will be struck from the ejector by the two spring-pressed type assembling pawls $R^4$ and frictionally held by the false rails $T^3$ against the lower rails T' of the type assembling chamber $R^9$. (See Fig. 2.)

As the action of the pawls $R^4$ is peculiar to my machine, I will describe them in detail.

Conveniently placed on the top of the ejector O is a cross rib $O^3$ raised to the same level as the longitudinal rib $O^2$, and which, as the ejector O passes under the assembling pawl holder $R'$, comes in contact with a lug $R^5$ on the lower side of each of the type assembling pawls $R^4$ intermediate its pivot and free end. As the ejector O passes under the type assembling pawls $R^4$, the cross rib $O^3$ engaging with the lugs $R^5$, lifts the free ends of the type assembling pawls and maintains them in their raised position until the type has been pushed into the type assembling chamber $R^9$. The cross rib $O^3$ then passes from contact with the lugs $R^5$ and allows the type assembling pawls $R^4$ to suddenly descend under the influence of their springs $R^8$ and strike the type from the end of the ejector O to the lower rails $T'$, against which it is frictionally held by the false rails $T^3$. (See Figs. 2, 3, 4 and 6.)

The lower rails $T'$ of the type assembling chamber are formed by continuing the sides of the space magazine U across a desired field, sufficient for the length of line the machine may be designed for, and between these sides is the space raceway $R^6$.

The upper rails $T^2$ are formed upon and are part of the hinged member R pivoted at $R^7$ to the amalgamating section G, and are provided with false rails $T^3$, which form with the lower rails $T'$, the means for assembling the line of types. The false rails $T^3$ are yieldingly contained in the lower edges of the upper rails $T^2$ and are spring-pressed to frictionally hold the types against the lower rails $T'$ as the types are delivered thereto, this yielding movement of the false rails automatically providing for two or possibly three variations in height of type without necessitating an adjustment of the upper rails. (See Figs. 2, 3 and 20.)

*Space and delivery.*—The spacer $U'$, which I now use, differs slightly from that shown in my said Patent 1,002,212, in so far as it now has a lengthwise slot $U^6$ to accommodate a guide rail $U^2$ supported within the space magazine U and space raceway $R^6$ (see Fig. 2) and a hooked foot $U^{10}$ to be engaged by the justifying shoe $D^{17}$ (see Fig. 8), this alteration in the construction of the spacer and the provision of the guide rail $U^2$ being a substantial improvement over my former construction, the guide rail, supporting the spacers during their return to the space magazine, preventing the displacement of the spacers at any period of their use, and keeping them always operative within the chamber provided for them.

The spacers $U'$ are retained within the space magazine U by the retaining pawls $U^3$ and the spring-pressed supporting head $U^4$ in such a position that when the outer spacer, which rests against the pawls $U^3$, is delivered into the line, it is raised up behind the last type until the notches $U^5$ in the sides of the spacer, register with the retaining pawls $U^3$. The spring-pressed supporting head $U^4$, then pushing against the body of spacers remaining in the space magazine U, forces the raised spacer out of the space magazine and into the space raceway $R^6$, the spacer itself being held in position by the guide rail $U^2$ and the laterally yielding rails $T^4$. The rails $T^4$ are partly contained in corresponding annular channels in the sides of the space raceway $R^6$, and partly project beyond the sides of the raceway to engage in the notches $T^5$ in the sides of the spacer $U'$ to hold the spacer in a suspended position within the space raceway as it advances with the assembling line of types (see Figs. 7, 9 and 16).

The delivery of the spacer from the space magazine U is effected through the medium of a space key $U^9$, and intermediate mechanism $U^8$, the space key being placed in the keyboard convenient for the operator.

I have now described the delivery of the types and spacers into an assembling line, the assemblage of which is continued until the length of line for which the machine is designed, is completed, or as nearly so as practice will allow. The succeeding operations of justifying the types to the exact length of line previously determined upon, locking the types in their justified condition within a line carriage, withdrawing the spacers from the justified line of types, returning the spacers to the space magazine, and tripping the low speed cam shaft for moving the line carriage with the justified line of types to the amalgamating mechanism, is then effected as follows:

*Width of line.*—Mounted under the keyboard E and within bearings on the bed plate C is a shaft $D^2$ on the right end of which is rigidly fastened the starting handle $D'$ (see Fig. 9). Also, attached to the shaft $D^2$ are the intermediate links and levers $D^3$ for the transmission of motion to the parts $D^4$ and $D^5$, vertically movable in dove-tail grooves within a bracket $C^2$ rigidly attached to the under side at the bed plate C. The two parts $D^4$ and $D^5$ are separated in a normal position but, when acted upon by the starting handle, the lower part $D^4$ moves upward until it meets the upper part $D^5$, to which it is then temporarily locked by the latch $D^{11}$, and both are carried upward to the limit of motion given the starting handle $D'$ (see Fig. 8). Attached to the lower part $D^4$ is an upright bar $D^6$ which protrudes through the bed plate C and normally is connected to a continuation $D^7$ mounted within the hinged member R (see Fig. 12). To the continuation $D^7$ and angular thereto is attached a plate $D^8$ having an oblique slot $D^{12}$ cut therein for moving a slide $D^9$ within the hinged member R. The slide $D^8$ in turn transmits motion to vertical jaws $D^{10}$ mounted within the channel $R^{10}$ provided within the hinged member R, which jaws are normally clear of the type in the type assembling chamber $R^9$ and are set apart to the exact length of the determined line. It follows, therefore, that from the motion imparted from the starting handle through the several parts mentioned, the first results of such motion is, through its sliding connection $D^8$, to push the jaws $D^{10}$ downward, setting them to engage the ends of the assembled line of types and spacers. With the setting of the jaws $D^{10}$ the roller $D^{13}$ attached to the moving slide $D^9$ passes into the vertical slot $D^{14}$, forming a continuation of the oblique slot $D^{12}$ in the plate $D^8$, to permit of a continued motion of the bar $D^6$, $D^7$ without further influencing the jaws $D^{10}$.

*Line resistant.*—Attached also to the upright bar $D^7$ moving vertically in the hinged member R, is the line resistant V, normally in operative relation with the line, to retard the advancing movement of the assembling types, and keep them in parallel relation and contact. This line resistant consists of two levers $V'$, $V^2$, pivoted at one end on a supporting member $V^3$ rigidly attached to the upright bar $D^7$. To the other end of the levers is hinged the line engaging member $V^4$ to move parallel, and, advanced step by step, with the assembling line of type (see Fig. 8). To one of the levers $V'$ cheek pieces $V^5$ are attached to frictionally press against the sides of the channel $R^{10}$ within the hinged member R to retard the movement of the line resistant as the line engaging member V is advanced by the assemblage of the types. When the line is completed, the starting handle $D'$ is operated and through its connected parts, $D^3$, $D^4$, $D^6$, $D^7$ and $V^3$, the line resistant V is lifted above the assembled line of types and spacers and out of operative relation with the line simultaneously with the setting of the jaws $D^{10}$, and by means of the pin $V^6$ projecting from the lever $V'$ passing behind a bracket $V^7$ attached to the hinged member R, the line resistant is prevented from returning to the starting end of the line until the full motion of the starting handle is attained, when the pin $V^6$ will pass over the top of the bracket $V^7$, and the line resistant will be thrown to the starting end of the line by the spring $V^8$, the line resistant being maintained above the path of the types until the line carriage has moved away with the justified line.

When the lower part $D^4$ meets the upper part $D^5$, they are connected together through the medium of the spring pressed latch $D^{11}$. As the two parts $D^4$, $D^5$, move upwardly to effect the setting of the line determining jaws at the ends of the line and to remove the line resistant from operative relation therewith, the latch $D^{11}$ performs no function, as the lower part $D^4$, pressing against the upper part $D^5$, forces it upward. For the return of the part $D^5$, it is necessary to provide a means similar to the latch $D^{11}$, whereby the part $D^4$ is enabled to draw the part $D^5$ downward with it. During the upward movement of the starting handle, the parts $D^4$, $D^5$, are drawn downward until the part $D^5$ is restored to its normal position, and owing to the locking together of the parts $D^4$, $D^5$, by the latch $D^{11}$, the return movement of the part $D^4$ is arrested when the part $D^5$ reaches its normal position. It is when the parts $D^4$, $D^5$, are arrested at the normal position of the part $D^5$, that the line resistant is maintained above the path of the justified line while the line carriage, actuated by the revolution of the low speed shaft H as hereinafter described under the caption "The line carriage", moves away with the justified line.

I have described under the caption "Justification", how the tensioned spacer return lever $I'$ is released from its set position and restores the spacers to the space magazine; how the action of the spacer return lever rocks the shaft $I^{99}$ and trips the clutch mechanism which effects the revolution of the low speed shaft H for the succeeding operations of restoring the spacer return lever to its normal position, setting in motion the means actuating the line carriage to remove the justified line from the place of type assemblage to the place where it receives the locking strip, and the succeeding actions of introducing the locking strip into the justified line, transferring the locking strip and line of types to the amalgamating mechanism where they are compressed together, casting the locking strip for the succeeding line and delivering the amalgamated line to the galley, and restoring the line carriage, with its jaws unlocked to its normal position with relation to the assembled line.

As the rock shaft $I^{99}$ turns while the spacer return lever is sweeping the spacers into the space magazine, a latch $D^{101}$, fixed on the rock shaft $I^{99}$, engages behind a shoulder $D^{102}$ on the latch $D^{11}$, so that when the cam $H^4$ revolves with the low speed shaft H, as described under the caption "Clutch mechanism of low speed shaft," to restore the rock shaft $I^{99}$ and spacer return lever $I'$ to their normal position, the latch $D^{101}$, by engaging with the shoulder $D^{102}$, withdraws the latch $D^{11}$ from its locking engagement with the part $D^4$ for its separation from the part $D^5$. The part $D^4$ then descends to its normal position, and causes, by its descent, the return of the line resistant to operative relation with the line at the starting end thereof.

To indicate the length of the assembled line of types and spacers, one of the levers $V'$ of the line resistant, is provided with a pointer $V^{16}$, and the bracket $V^3$ is provided with a dial $V^{15}$.

*Justification.*—When the lower part $D^4$ meets the upper part $D^5$ and through the medium of the spring pressed latch $D^{11}$ attaches itself thereto, the two parts $D^4$, $D^5$, move upward in unison. Attached to the upper part $D^5$ are hollow guide rods $D^{15}$ in which are contained the spring pressed guide rods $D^{16}$ of the justifying shoe $D^{17}$ which, when moved upward, engages the hooked feet $U^{10}$ of the spacers $U'$ and advances them between the types, and by reason of the tapered sides $U^7$ of the spacers, spreads the types apart to the limits formed by the jaws $D^{10}$. Should the types fully fill the space provided between the jaws $D^{10}$ before the limit of motion provided for the starting handle $D'$ is reached, the springs $D^{18}$ under the guide rods $D^{16}$ give way and permit the parts attached to the starting handle $D'$ to travel to the full limit of motion without effecting the further movement of the justifying shoe $D^{17}$. It is therefore immaterial whether the types are spread a greater or less distance by the taper of the spacers, as the action of the starting handle and the movement of its related parts provides that a full motion of the starting handle $D'$ shall be made in order that the succeeding actions shall be effected. (See Figs. 8, 10 and 11.)

So necessary is it that an exact movement of the parts stated shall take place in proper order and time, that I have provided a locking device to control the action of the parts until the limit of motion has been attained. (See Fig. 32.) This locking device (see Fig. 29) consists of a locking pawl $D^{10}$ engaging with the toothed face of a rack $D^{201}$ forming part of an upright finger $D^{20}$ attached to the part $D^5$ and preventing the reverse movement of the parts $D^4$ and $D^5$ until the pawl releasing shoulder $D^{21}$ of the upright finger $D^{20}$ shall have engaged the pawl $D^{10}$ and positioned it to be engaged and held by the spring pressed detent $D^{22}$ for the return of the parts $D^4$ and $D^5$.

The downward motion of the starting handle $D'$ effects the following actions, viz: It sets the jaws $D^{10}$ at the ends of the line and simultaneously therewith, removes the line resistant $V$ from the path of the assembled line of types and spacers and renders it inoperative, pushes the spacers $U$ between the types and spreads the line to the limits provided by the jaws $D^{10}$, and finally, the line carriage control consisting of an upright finger $D^{20}$ attached to the part $D^5$ reaches the limit of its movement and striking the intermediate plate $D^{23}$ and through it the pawls $S^6$ releases the movable jaws $S^5$, normally set in an open position, which in turn lock the justified line against the stationary carriage jaws $S^{201}$ of the line carriage $S$, now more fully set out under the caption of "Line carriage," and simultaneously displaces the pawl $D^{10}$ to be engaged and held by the detent $D^{22}$. The starting handle having reached the limit of its downward motion is then reversed, and with the return of the parts actuated thereby, the spacers $U'$ are drawn downward, by the justifying shoe, out of contact with the types until the upper ends of the slots $U^6$ shall engage the bar $U^2$, the spacers $U'$ then registering with the space magazine when a tripping pawl $D^{25}$ pivotally attached to the upright bar $D^6$ withdraws a bolt $D^{26}$ movable within the rigid bracket $C^2$ and releases the spring tensioned spacer return lever $I'$ from its set position the tripping pawl $D^{25}$ and bolt $D^{26}$ constituting a control for the action of the spacer return lever. Within the raceway provided for the movement of spacers $U'$, a spacer returning plate $I^4$ is slidably mounted with a pin $I^5$ passing out and engaging in a slot $I^6$ within the free end of the spacer return lever $I'$ so that when the lever is released, the spacer returning plate $I^4$ shall sweep the spacers $U'$, which have been withdrawn into the space raceway, ahead of it and past the spacer retaining pawls $U^3$ into the space magazine $U$ while the opposite end of the lever $I'$ will rock the shaft $I^{99}$ when the last spacer has been returned to the space magazine $U$ and trip the clutch mechanism of the low speed shaft $H$ hereinafter described.

During the revolution of the low speed shaft $H$, the cam $H^4$ engages with the crank arm $I^{32}$ and rocks the shaft $I^{99}$ to restore it, during the revolution of the shaft, to its initial position. The spacer return lever $I'$ is fixed on the shaft $I^{99}$ and the rocking of the shaft $I^{99}$ by the cam $H^4$ restores the spacer return lever and spacer returning plate $I^4$ to their normal position where the spacer return lever is again engaged and held by the bolt $D^{26}$ for the succeeding operation of the starting handle. (See Figs. 10 to 16 incl.)

*The line carriage.* (See Figs. 22, 23, 29, 30 and 31.)—The line carriage $S$ is arranged to reciprocate in grooves $G^{25}$ provided within the hinged member $R$ and the housing $G'$, $G^2$, in the amalgamating section $G$, and is composed of two plates $S'$ connected by the links $S^3$ to the free end of a lever $S^4$ fulcrumed within the bed plate $C$ of the machine, the opposite end of the lever $S^4$ engaging a cam $H'$ on the low speed shaft $H$. The two plates $S'$ of the line carriage with their movable jaws $S^5$ and locking pawls $S^6$ are identically the same. The movable jaws S⁵, actuated by bell cranks S²⁰² coupled together by bars S²⁰³ moving in one direction under tension of their springs S²⁰ and in the other direction under the influence of the lever C', are retained by the locking pawls S⁶ and are arranged to move upward in parallel relation when released by the intermediate plate D²³ actuated by the justifying means. Upon the completion of the justification and the tripping of the pawls S⁶ within the line carriage, the movable jaws S⁵ are released and lock the types tightly against the relatively stationary jaws S²⁰¹ of the line carriage S and retain them in that position until they have received the type metal locking strip which amalgamates the justified types into a composite line. When the spacers have been restored to the space magazine and the clutch mechanism for the low speed shaft H has been tripped, the low speed shaft H revolves and the line carriage with the type locked therein, moves from the type assembling chamber R⁹ to a position over the lead strip mold G³ where a type metal locking strip, previously prepared, is impressed into the grooves of the type against an anvil R¹¹ mounted within the hinged member R and actuated by a compound lever G⁵⁰ having operable connections G⁵⁷ consisting of an arm, link, and lever with the cam G¹⁵⁷ on the low speed shaft H to sustain the thrust of the mechanism which delivers the type metal locking strip from the locking strip mold (see Figs. 2 and 19). In that position and with the type pressed tightly against the anvil R¹¹ and held there by the strip forcing hammer G⁴, the jaws S⁵ of the line carriage are unlocked by the lever C' mounted within bearings on the bed plate C, and the line carriage is moved back by the reverse movement of the lever S⁴ to the type assembling chamber prepared for receiving the succeeding line of types.

*Strip making mechanism.*—Pivoted within the housings G' and G² of the amalgamating section G is the locking strip mold G³ arranged and provided with means, consisting of a spur wheel G²⁰ and rack G²¹ for effecting an oscillating movement about ninety degrees turn, from an upright to a horizontal position (see Figs. 19 and 21). In its horizontal position, the mold G³ fronts on the mouth P' of a melting pot P arranged to deliver the molten metal through a perforated stripper plate P² into the mold G³. Before the separation of the pot mouth P' and stripper plate P² from the lead strip mold G³ the stripper plate P² is given a slight movement lengthwise of the mold, for shearing off the gates which may have been formed on the metal locking strip just cast, this movement of the stripper plate being effected by connections C¹⁶ actuated by the cam H' on the low speed shaft H (see Fig. 33). The mold G³ with the locking strip then assumes an upright position below the path of the line carriage S which, during its reciprocations, straddles the mold G³. Within and forming a part of the mold G³ is a moving element G⁴ (see Fig. 24), having in the upright position of the mold a connection, through a pivoted lever G⁵, with a cam H² on the low speed shaft H (see Fig. 24). When the line of types is in position over the locking strip mold G³, action is imparted by the low speed shaft H, cam H² and lever G⁵ to the moving element G⁴ which forces the locking strip upward and out of the mold and introduces it into the grooves of the type temporarily spreading the locking strip therein by pressing the line of types tightly against the anvil R¹¹ which resists the pressure of the moving element on the types until after the line carriage has been unlocked and passes out from its position within the amalgamator. The line is then released by the return of the moving element G⁴ and an ejector G⁶ (see Figs. 22 and 23), pushes the line from between the mold and the anvil across a bridge S⁷ (see Fig. 29) attached to one of the connecting links S³ of the line carriage, upon a compressor table G⁷.

*Amalgamator.*—The line which has just been deposited upon the compressor table G⁷, while it has received the locking strip for binding the types, has not been fully compressed and neither have the types been accurately alined. In the actions now succeeding this is effected. The compressor table G⁷ is slidably arranged for upward movement between the housing G', G², and is actuated, through a toggle G²⁹ and lever G⁸, by a cam H⁹ mounted on the low speed shaft H, (see Figs. 2, 21, 22 and 23). Opposite and above the compressor table G⁷ is what I have termed an amalgamator G¹⁰. This amalgamator G¹⁰ is pivoted and timed to move in unison with the strip making mold G³ and has an oscillating movement equivalent to a quarter of a circle, and in its vertical position its mouth is opposite and over the compressor table G⁷ and the recently deposited line of type. The amalgamator effects the final alinement and compression of the types to the exact height and thickness of line. The front plate G¹¹ of the amalgamator is relatively stationary and against it the faces of the types are alined by the ejector G⁶ and the feet are evened by the rear plate G¹² which is hinged at G⁶⁰ and has a powerful cam movement G⁶¹ inward and against the feet of the types as the line is pressed up and into the amalgamator G¹⁰ by the compressor table G⁷. As the faces of the types are alined against the stationary plate G¹¹ and the feet of the composite line are evened against the rear plate $G^{12}$, the receiving plate $G^{13}$ gives way under the upward movement of the line of types and the compressor table $G^7$, and forces the cam $G^{61}$ upward against the rear plate $G^{12}$ until the exact height of the type plate has been attained, when the compressor table $G^7$ squeezes the locking strip smoothly and evenly to the surface of the types themselves, disposing of any surplus metal in the spaces formed by the withdrawal of the spacers. The compressor table $G^7$ is then withdrawn from the amalgamator $G^{10}$ and the line is gripped between the fixed front plate $G^{11}$ and rear plate $G^{12}$ and remains held by them while the amalgamator $G^{10}$ makes a quarter turn, by means of the spur wheel and rack $G^{55}$ actuated by operable connections $G^{56}$ from the cam $G^{57}$ on the low speed shaft H, and positions itself in front of a receiving galley $G^{14}$ (see Fig. 19). The line of types is then ejected by the compound lever $G^{50}$ pushing against the links $G^{51}$ and moving the receiving plate $G^{13}$ outward when the amalgamator is in its horizontal position, the outward movement of the receiving plate in turn restoring to its normal position the cam $G^{61}$, which has actuated the rear plate $G^{12}$ to lock the line of types between the stationary plate $G^{11}$. The amalgamator $G^{10}$ then makes a quarter turn and resumes its normal position.

The galley $G^{14}$ is of the usual form for receiving lines of type of uniform length and thickness and may be arranged to reciprocate to and from the amalgamator $G^{10}$ at proper intervals to receive the finished product therefrom.

*Clutch mechanism of low speed shaft.—* In my description of the justification, I have stated that when the spacer return lever I' has restored the spacers to the space magazine, the clutch mechanism that starts the low speed shaft H is tripped, this being effected as follows: Mounted upon the low speed shaft H and moving with it is the cam $H^4$ (see Figs. 8, 16, 17 and 18). Within the cam $H^4$ and parallel with the shaft H, is a spring pressed pin $I^{15}$ held normally to project from the side of the cam $H^4$ and retain a beveled finger $I^7$ attached to a spring tensioned shaft $I^8$ mounted upon the bed plate C and set at right angles to the low speed shaft H, and passing under the same. The pin $I^{15}$ is held against the tension of the shaft $I^8$ and beveled finger $I^7$ by a locking plate $I^9$, capable of oscillating movement upon a pin $I^{17}$ in a recess $I^{30}$ formed in the cam $H^4$ (see Fig. 17). A spring pressed locking plate $I^{31}$ having a finger $I^{10}$ is hinged to the cam $H^4$, the finger $I^{10}$ overhanging the cam $H^4$ in such a manner that, when the upper end of the spacer return lever I' has completed the work of returning the spacers to the space magazine, a spring tensioned shaft $I^{99}$, to which it is fixed, will rock, and the crank $I^{32}$ at the end of the shaft $I^{99}$ shall strike the finger $I^{10}$ and, moving the plate $I^{31}$ slightly, will withdraw the pin $I^{50}$ from the path of the locking plate $I^9$ and allow the locking plate $I^9$ under the influence of the spring $I^{33}$ to move out of the path of the pin $I^{15}$. The pressure of the finger $I^7$ and spring tensioned shaft $I^8$ then causes the pin $I^{15}$ to recede within the cam $H^4$ and allow the shaft $I^8$ to rock under the influence of its spring $I^{60}$, the movement thus given to the shaft $I^8$ being in turn imparted to a detent finger $I^{11}$ fixed on the shaft $I^8$ and connected to a bar $I^{12}$ slidably mounted within the front apron of the bed plate C. To one end of the bar $I^{12}$ is attached a pivoted yoke $I^{13}$ formed with points $I^{20}$ to throw a toothed ring $I^{14}$ slidably keyed on the low speed shaft H into and out of mesh with relation to a constantly running toothed ring $I^{25}$ connected through suitable reducing gearing $I^{26}$ to a driving motor. It follows that movement of the detent bar $I^{12}$ to which the yoke $I^{13}$ is attached, will connect or disconnect, through the meshing of the toothed rings, the driving of the low speed shaft H. Thus at any point in the cycle of movement of this low speed shaft the power may be disconnected at will by the operator, by moving the detent bar $I^{12}$, and that as the cycle of the shaft is completed, the pin $I^{15}$ having again sprung into the path of the beveled finger $I^7$ and being held there by the plate $I^9$ resuming, under the influence of the roller $I^{40}$ its position covering the end of the pin $I^{15}$ and being retained in that position by the spring pressed locking plate $I^{31}$ and pin $I^{50}$, interferes with the beveled finger $I^7$ and automatically disconnects through the agency of its related parts, the toothed rings and throws the low speed shaft out of action until the spring pressed pin $I^{15}$ shall have again been released.

To prevent the subsequent action of the starting handle until the low speed shaft shall have completed its revolution, I have provided a control for the starting handle D'. This control consists of forming in the cam $H^4$, a recess $H^{101}$ to receive a lockoff dog $H^{102}$ actuated by the links $D^3$ when the starting handle D' is moved downward, this recess $H^{101}$ being in line with the lockoff dog when the low speed shaft is in its normal position. When the low speed shaft is in its normal position, the lockoff dog will enter the recess $H^{101}$ and permit of the downward movement of the starting handle D'. When the starting handle D' has been moved upward to nearly its normal position, the low speed shaft starts its revolution and rotates the cam $H^4$, the recess $H^{101}$ then moving out of line with the lockoff dog $H^{102}$ and the raised surface of the cam coming into line with the lockoff dog to prevent its movement and that of the starting handle until the low speed shaft shall have completed its revolution and brought the recess again into line with the lockoff dog. By this means I am able to prevent any subsequent action of the parts $D^4$, $D^5$ while the low speed shaft is revolving, and by means of this prevention, I am able to control the movement of the line jaws, the line resistant, and the justifying means. I find that this control is necessary, as without it, a succeeding action of the starting handle $D'$ could be effected, which would bring the line jaws into the path of the justified type, and not only disorganize their justified relation, but would, in all probability, displace them from the line carriage, and possibly cause a breakage of some of the parts of the apparatus.

I have herein described operative means for the assemblage of the types and spacers, the justification, the locking of the justified types, their delivery to an amalgamator mechanism in which a locking strip is impressed into the justified types and the product has been delivered to a galley, and the stop and start mechanism through which these several actions are effected, but I wish it to be understood that these means may be varied within the scope of the appended claims without departing from the principles of the invention.

Having thus described my invention, I claim:

1. In a typographic machine, a type body mold comprising a movable mold part having a dove tail core, and an ejector having a dove tail groove to receive the dove tail core whereby the ejector and mold part are slidably connected to move unitedly to and from the casting position.

2. In a typographic machine in which the types are delivered from the casting position to a place of type assemblage, means for composing and assembling a line of types, and a mold comprising a movable mold part having a core to form one side of a grooved type and carry it from the casting position to the place of type assemblage.

3. In a typographic machine in which the types are delivered from the casting position to a place of type assemblage, means for composing and assembling a line of types, a type mold comprising a movable mold part having a core to form one side of a grooved type and carry it from the casting position to the place of type assemblage, and means to separate the type from the movable mold part at the place of type assemblage.

4. In a typographic machine in which the types are delivered from the casting position to a place of type assemblage, in combination, means for composing and assembling a line of types, a mold comprising a movable mold part having a core to form one side of a grooved type, means for causing the movable mold part to move from the casting position to the place of type assemblage, and means for separating the type from the movable mold part at the place of type assemblage.

5. In a typographic machine in which the types are delivered from the casting position to a place of type assemblage, means for assembling a line of types, a mold comprising a movable mold part, having a core to form a grooved type and carry it from the casting position to the place of type assemblage, and an ejector associated with said movable mold part to form another side and determine the type body size.

6. In a typographic machine in which the types are delivered from the casting position to a place of type assemblage, means for composing and assembling a line of types, a movable mold part having a core to form one side of a grooved type and carry it to the place of type assemblage, and an adjustable mold part associated with the movable mold part to form another side and determine the type body size.

7. In a typographic machine, a mold, comprising a movable mold part having a core to form one side of a grooved type, and an ejector associated with said movable mold part to form another side, the ejector having a groove to receive said core whereby the ejector and movable mold part are slidably connected to form two sides of a grooved type and determine the type body size.

8. In a typographic machine in which the types are delivered from the casting position to a place of type assemblage, means for composing and assembling a line of types, a mold, comprising a movable mold part to carry each type from the casting position to the place of type assemblage, and means for effecting the separation of the type from the movable mold part at the place of type assemblage.

9. In a typographic machine in which the types are delivered from the casting position to a place of type assemblage, means for composing and assembling a line of types, a mold comprising a movable means for carrying each type from the casting position to the place of type assemblage, and means to effect the separation of the type from the movable means at the place of type assemblage.

10. In a typographic machine in which the types are delivered from the casting position to a place of type assemblage, means for composing and assembling a line of types, a mold comprising means movable in a fixed path for carrying each type from the mold to the place of type assemblage, and means to effect the separation of the type from the movable means at the place of type assemblage.

11. In a typographic machine in which the types are delivered from the casting position to a place of type assemblage, means for composing and assembling a line of types, a mold comprising movable means for carrying each type from the casting position to the place of type assemblage, means to retain the movable means in a fixed path during its movement, and means to effect the separation of the type from the movable means at the place of type assemblage.

12. In a typographic machine, a type mold, comprising a movable mold part having a core to form one side of a grooved type, and an ejector to form another side and determine the type body size, said ejector having a groove to receive said core whereby the ejector and movable mold part are slidably connected to move unitedly to and from the casting position.

13. In a typographic machine, a type body mold, comprising a movable mold part having a dovetail core, and an ejector having a dovetail groove to receive the dovetail core, whereby the ejector and mold part are slidably connected to determine the type body size and form two sides of a type having a dovetail groove.

14. In a typographic machine, a type mold, comprising a movable mold part, and an ejector slidably connected to determine the type body size and to form two sides of a type, and means for actuating the movable mold part and ejector to carry the type from the casting position.

15. In a typographic machine, a type mold, comprising a movable mold part having a dovetail core and an ejector having a dovetail groove to receive the dovetail core, whereby the ejector and mold part are slidably connected to move to and from the casting position.

16. In a typographic machine, a type mold, comprising a movable mold part having a dovetail core, and an ejector having a dovetail groove to receive the dovetail core, whereby the ejector and mold part are slidably connected to move unitedly to and from the casting position and to permit of the continued movement of the ejector when the movement of the mold part is arrested.

17. In a typographic machine, a mold, comprising a mold supporting structure, and an ejector and a movable mold part slidably connected to move unitedly to and from the casting position, the mold supporting structure having an abutment to arrest the movable mold part when returned to its normal position.

18. In a typographic machine in which the types are delivered from the casting position to a place of type assemblage, means for composing and assembling a line of types, a mold comprising a movable element for the carriage of each type to the place of assemblage, and means to effect the separation of the type from the movable element.

19. In a typographic machine in which the types are delivered from the casting position to a place of type assemblage, means for composing and assembling a line of types, a mold comprising a movable element for the carriage of each type to the place of assemblage, means to retain the movable element in a fixed path, and means to effect the separation of the type from the movable element at the place of assemblage.

20. In a typographic machine in which the types are delivered from the casting position to a place of type assemblage, a mold, comprising a movable element for the casting of the type and its carriage to the place of assemblage, means to steady the movable element during its movements, and pawls to effect the separation of the type from the movable element at the place of assemblage.

21. In a typographic machine, a mold, an ejector for the delivery of the type from the mold, said ejector having a raised rib lengthwise of its top surface, and a cross rib at its free end raised to the same level as the lengthwise rib, means to engage the lengthwise rib and steady the movement of the ejector, pawls to effect the separation of the type from the ejector, and lugs for the pawls engaged by the cross rib to raise the pawls clear of the type as the ejector moves to the delivery position.

22. In a typographic machine, a mold, comprising a mold supporting structure, a movable mold part forming one side of the mold, a movable mold cap forming two other sides, and means associated with the movable mold part and mold cap forming the remaining side and determining the type body size, said movable mold part being movable to and from the mold supporting structure.

23. In a typographic machine, a mold supporting structure, and a mold comprising a movable mold part for the casting of the type and its carriage from the casting position, a mold cap associated with the movable mold part and movable into and out of operative relation therewith, and means associated with the mold cap and movable mold part for determining the type body size, said movable mold part being movable to and from the mold supporting structure.

24. In a typographic machine, a mold, comprising a mold supporting structure, a movable mold part for the casting of the type and its carriage from the casting position, a mold cap associated with the movable mold part and movable into and out of operative relation therewith, and means associated with the mold cap and movable mold part for determining the type body size, said movable mold part being movable to and from the mold supporting structure.

25. In a typographic machine, a mold, comprising a movable mold part forming one mold side, an ejector slidably connected to the movable mold part forming another side, and a movable mold cap forming the other two sides.

26. In a typographic machine, a mold, comprising a movable mold part forming one mold side, and an ejector forming another mold side, the ejector and movable mold part being slidably connected to determine the type body size and move unitedly for the carriage of the type from the casting position, and a mold cap associated with the movable mold part and ejector forming the other two mold sides.

27. In a typographic machine, a mold, comprising a mold supporting structure, a movable mold part forming one mold side, and an ejector forming another mold side, the ejector and movable mold part being slidably connected to determine the type body size and move unitedly for the carriage of the type from the casting position, and a mold cap forming the other two mold sides, the mold supporting structure being provided with means to arrest the movable mold part when returned to its normal position.

28. In a typographic machine, a mold, comprising a movable mold part, guide rails along which the mold part moves, a pivoted friction wheel engaging the movable mold part and preventing it leaving the guide rails, and type assembling pawls to strike the type from the movable mold part.

29. In a typographic machine in which the type is delivered from the casting position to a place of type assemblage, a mold comprising a movable mold part and an ejector slidably connected to determine the type body size and to carry the type from the casting position, guide rails for the movable mold part, means to prevent the movable mold part leaving the guide rails as it moves to and from the casting position, and spring-pressed pawls to strike the type from the ejector at the place of type assemblage.

30. In a typographic machine, a type mold, comprising a mold supporting structure, a movable mold part and an ejector slidably connected to determine the type body size and to move unitedly to and from the casting position, guide rails along which the movable mold part moves, means to engage the ejector during its movement and prevent the movable mold part leaving the guide rails in its flight to and from the casting position, and type assembling pawls to strike the type from the end of the ejector at the place of type assemblage.

31. A typographic machine comprising means for casting types, means for effecting the assembly of the types into a composed line, spacing means interposed between the type casting means and the assembling means and means forming part of the type casting means for delivering the types across the spacing means to the type assembling means.

32. In a typographic machine, means for casting types, means for composing and assembling the types, means forming part of the type casting means for carrying the types to the type assembling means, and means for removing the types from the type carrying means to the type assembling means.

33. In a typographic machine, means for casting types, means for assembling them into a line, spacing means interposed between the type casting means and the assembling means, and means forming part of the type casting means for delivering the types across the spacing means to the type assembling means.

34. In a typographic machine, type casting means, type assembling means associated therewith, means forming part of the type casting means for delivering the types to the type assembling means, and means forming part of the type assembling means to yieldingly hold the types during their assemblage.

35. In a typographic machine, means for casting types, means for assembling them into a line comprising type supporting rails, and yielding rails opposed to the type supporting rails frictionally engaging the types delivered to the type supporting rails, said yielding rails having movement in a plane parallel to the type supporting rails, to accommodate lines of types of different thicknesses, and means for justifying the line of types when assembled.

36. In a typographic machine, means for casting types, means for assembling them into a line comprising type supporting rails, false rails opposed to the type supporting rails to frictionally engage the types, and means to yieldingly hold the false rails in operative relation with the type supporting rails, said false rails having a yielding movement in parallel relation to the type supporting rails to accommodate lines of types of different thicknesses, and means for justifying the line of types when assembled.

37. In a typographic machine, means for assembling a line of types, comprising two lower rails, two upper rails opposed to the lower rails, and false rails yieldingly held by the upper rails and coöperating with the lower rails to frictionally hold the types, said false rails having a yielding movement in parallel relation to the lower rails to accommodate lines of types of different thicknesses.

38. In a typographic machine, means for assembling a line of types, yielding rails associated therewith, a tapered spacer having parallel sides notched to engage with the yielding rails and having an elongated slot lengthwise of its body part, and a guide rail passing through the elongated slot.

39. In a typographic machine, a spacer magazine, a tapered spacer having parallel sides with notches therein and a slot lengthwise of its body part, a spacer raceway, yielding rails contained within the spacer raceway to engage with the notched sides of the spacer, and a guide rail within the spacer magazine and spacer raceway passing through the slot in the spacer.

40. In a typographic machine, a spacer magazine, a spacer raceway, yielding rails within the spacer raceway, a tapered spacer having parallel sides with notches therein to engage with the yielding rails, and having an elongated slot lengthwise of its body part, a guide rail supported within the spacer magazine and spacer raceway passing through the elongated slot, means for delivering the spacer from the spacer magazine into the assembling line, and means for advancing the spacer to justify the line and withdrawing it therefrom for its return to the spacer magazine.

41. In a typographic machine, a spacer magazine, a spacer stored therein, means to eject the spacer from the spacer magazine, a spacer raceway, means to hold the spacer suspended within the spacer raceway when ejected from the spacer magazine, and means to support the spacer during its return to the spacer magazine, said spacer having a lengthwise slot for the spacer supporting means.

42. In a typographic machine, a spacer magazine, a spacer raceway, yielding rails within the spacer raceway, a spacer normally stored in the spacer magazine, said spacer having parallel sides with notches therein to engage with the yielding rails and a slot lengthwise of its body part, and a guide rail supported within the spacer magazine and spacer raceway passing through said slot.

43. In a typographic machine, a spacer magazine, a spacer raceway, yielding rails within the spacer raceway, a spacer normally stored in the spacer magazine, said spacer having parallel sides with notches therein to engage with the yielding rails and a slot lengthwise of its body part, and a guide rail supported within the spacer magazine and spacer raceway passing through said slot, means for ejecting the spacer from the spacer magazine into the spacer raceway, and means for returning the spacer from the spacer raceway to the spacer magazine, said spacer during its return being supported by the guide rail.

44. In a typographic machine, a spacer magazine, a spacer normally stored therein, a spacer raceway, means to eject the spacer from the spacer magazine into the spacer raceway, means within the spacer raceway to hold the spacer in an operative position, and means to support the spacer during its return to the spacer magazine, said spacer having a lengthwise slot for the spacer supporting means.

45. In a typographic machine, means for producing types and assembling them into a line, a spacer magazine, a spacer normally stored therein, means to eject the spacer from the spacer magazine and introduce it between the assembling types, means to retain the spacer between the types during their assemblage, and means to support the spacer during its return to the spacer magazine, said spacer having a lengthwise slot for the spacer supporting means.

46. In a typographic machine, a type mold, type assembling means, and a spacer magazine interposed between the type mold and the type assembling means, said type mold having a movable mold part for carrying the type across the spacer magazine to the type assembling means.

47. In a typographic machine, a type mold, type assembling means, and a spacer magazine interposed between the type mold and the type assembling means, said type mold comprising a movable element for the carriage of the type across the spacer magazine to the type assembling means.

48. In a typographic machine, a type mold, type assembling means, a spacer magazine interposed between the type mold and the type assembling means, said type mold comprising a movable element for the carriage of the type across the spacer magazine to the type assembling means, and means for separating the type from the movable element and delivering it to the type assembling means.

49. In a typographic machine, means for producing individual types and assembling them into a line in the order of their production, two line jaws associated therewith positioned normally clear of the assembling types and set apart to the exact length of line, a controlling element, and a sliding connection between the controlling element and the line jaws, by which the line jaws are moved into and out of operative relation with the line.

50. In a typographic machine, means for producing individual types and assembling them into a line in the order of their production, two line jaws associated therewith positioned normally clear of the types and set apart to the exact length of line, means for justifying the line, means for setting the line jaws at opposite ends of the line prior to justification, and means for removing the justified line from the type assembling means.

51. In a typographic machine, means for assembling a line of types, two line jaws associated therewith positioned normally clear of the types and set apart to the exact length of line, means for justifying the line, and a controlling element connected with the line jaws and with the justifying means, the initial movement of the controlling element setting the line jaws to engage the opposite ends of the line and then actuating the justifying means to spread the line to the limits provided by the line jaws.

52. In a typographic machine, means for assembling a line of types, two line jaws associated therewith positioned normally clear of the types and set apart to the exact length of a line, a line resistant, means for justifying the line, and a controlling element connected with the line jaws, the line resistant and the justifying means whereby the operation of the controlling element simultaneously removes the line resistant from operative relation with the line and sets the line jaws to engage the ends of the line and then actuates the justifying means to spread the line to the limits provided by the line jaws.

53. In a typographic machine, means for assembling a line of types, means for determining the length of line normally positioned clear of the path of the types, a line resistant normally positioned in the path of and advanced step by step with the assembling line, spacers and a controlling element connected with the line determining means and line resistant whereby the operation of the controlling element simultaneously removes the line resistant from operative relation with the line and sets the line determining means to engage the ends of the line, and means actuated by the controlling element to advance the spacers to spread the line to the limits provided by the line determining means and then withdraw the spacers from operative relation therewith.

54. In a typographic machine, a line resistant, comprising two pivotally connected levers, and a line engaging member connected to the levers to move in parallel relation with an assembling line of types.

55. In a typographic machine, a line resistant, comprising two pivotally connected levers, a line engaging member connected to the levers to move in parallel relation with an assembling line of type, and means attached to one of the levers to frictionally retard the movement of the line resistant.

56. In a typographic machine, means for assembling a line of types, a line resistant having operative relation therewith, comprising two pivotally connected levers and a line engaging member connected to the levers to move in parallel relation with the assembling types, and means to remove the line resistant from and restore it to operative relation with the line.

57. In a typographic machine, means for assembling a line of types, a line resistant having operative relation therewith, comprising two pivotally connected levers, a line engaging member connected to the levers to move in parallel relation with the assembling line, and means attached to one of the levers to frictionally retard the movement of the line resistant, and means to remove the line resistant from and restore it to operative relation with the line.

58. In a typographic machine, means for assembling a line of types, a line resistant advanced step by step during the assembly of the line, a supporting member to which the line resistant is pivotally connected, and means for actuating the supporting member to remove the line resistant from operative relation with the line until the line has been removed from its place of assemblage and to then restore the line resistant to its initial position.

59. In a typographic machine, means for casting types, means for assembling them into a line, means for delivering the types from the casting means to the assembling means, a line resistant advanced step by step with the assembling types, means for frictionally retarding the advance of the line resistant, and operable means to move the line resistant into and out of operative relation with the line.

60. In a typographic machine, means for casting types, means for assembling them into a line, a line resistant having operative relation with the line advanced step by step as the types are introduced into it, means for retarding the line resistant and holding it in contact with the line, means to justify the line, and means actuating the justifying means, said actuating means removing the line resistant from and restoring it to operative relation with the line.

61. In a typographic machine, means for casting types, means for assembling them into a line, a line resistant having operative relation with the line and advanced step by step as the types are assembled, means for frictionally retarding the advance of the line resistant, means for removing the line resistant from operative relation with the line, means for justifying the line, means for removing the justified line from its place of assemblage, and means to automatically return the line resistant to its initial position at the starting end of the line when the justified line has been removed.

62. In a typographic machine, means for casting types, means for assembling them into a line, a line resistant having operative relation therewith and advanced step by step as the types are assembled, means for frictionally retarding the advance of the line resistant, means for removing the line resistant from operative relation with the line, means to justify the line, a line carriage to remove the justified line from the place of type assemblage, and means to automatically restore the line resistant to its initial position at the starting end of the line when the line carriage has moved away with the justified line.

63. In a typographic machine, means for casting types, means for assembling them into a line, two jaws set apart to the exact length of line and normally clear of the types, a line resistant normally in the path of the line, and means for setting the jaws at the ends of the line and removing the line resistant therefrom.

64. In a typographic machine, means for casting types, means for assembling them into a line, means for determining the length of line normally positioned clear of the types, a line resistant normally in the path of the line and advanced step by step with the assembling types, means for moving the line resistant into inoperative relation with the line, and justifying means to spread the line to the limits provided by the line determining means.

65. In a typographic machine, means for casting types, means for assembling them into a line, two line jaws set apart to the exact length of line and normally clear of the types, a line resistant normally positioned in the path of the line and advanced step by step with the assembling types, justifying means, and operable means, to position the line jaws at the ends of the line, to remove the line resistant from operative relation therewith, and to advance the justifying means to spread the line to the limits provided by the line jaws.

66. In a typographic machine, means for casting types, means for assembling them into a line, means for determining the length of the line normally positioned clear of the path of the line of types, a line resistant normally in the path of the line, means for setting the line determining means at the ends of the line and removing the line resistant therefrom, and justifying means to spread the line to the limits provided by the line determining means.

67. In a typographic machine, means for casting types, means for assembling them into a line, means for determining the length of the line normally positioned clear of the path of the line of types, a line resistant normally in the path of the line, means for setting the line determining means at the ends of the line and removing the line resistant therefrom, justifying means to spread the line to the limits provided by the line determining means, and means to remove the justified line from the place of type assemblage.

68. In a typographic machine, means for casting types, means for assembling them into a line, two line jaws normally positioned clear of the types and set apart to the exact length of line, a line resistant, and operable means to remove the line resistant into and out of operative relation with the line, said operable means having a sliding connection with the line jaws to bring them into operative relation with the line as the line resistant is removed from operative relation therewith.

69. In a typographic machine, means for assembling a line of types, a supporting means, a line resistant advanced step by step by the types as they are assembled, said line resistant comprising two levers pivotally connected at one end to the supporting means and having at their other end a line engaging member to move in parallel relation with the assembling types, and means to retard the action of the line resistant during its advance.

70. A typographic machine, comprising means for assembling a line of types, means for justifying the line, line jaws set apart to the exact length of line and normally clear of the types, a line resistant normally positioned in the path of the types, and actuating means whereby the line jaws are set at the ends of the line and simultaneously therewith the line resistant is removed from the path of the types and the justifying means are actuated to spread the line to the limits provided by the line jaws.

71. A typographic machine, comprising means for assembling a line of types, means for justifying the line, line jaws set apart to the exact length of line and normally clear of the types, a line resistant normally positioned in the path of the types, a line carriage, and actuating means whereby the line jaws are set at the ends of the line and simultaneously therewith the line resistant is removed from the path of the types, the justifying means are actuated to spread the line to the limits provided by the line jaws, and the line carriage is actuated to lock the line in its justified condition and remove it from the place of type assemblage.

72. In a typographic machine, means for casting types, means for assembling the types into a line, normally inoperative means for determining the length of line, a normally operative line resistant, and means for removing the line resistant from operative relation with the line and bringing the line determining means into operative relation with it.

73. A typographic machine comprising means for assembling a line of types, means for determining the length of line normally positioned clear of the path of the types, a line resistant normally positioned in the path of and advanced step by step with the assembling line, means for spacing the line, and means for setting the line determining means at the ends of the line, removing the line resistant from the path of the line and advancing the spacing means to spread the types to the line determining means.

74. A typographic machine comprising means for assembling a line of types, means for determining the length of line, a line resistant, means for spacing the types, a line carriage, and operable means for bringing the line determining means into operative relation with the line, removing the line resistant from operative relation with the line, actuating the spacing means to spread the line to its limits, and actuating the line carriage to lock the line in its spaced condition.

75. In a typographic machine having means for producing types in any desired order and assembling them into a line, a spacer magazine, spacers, means to introduce the spacers into the assembling line, justifying means to advance the spacers and spread the line to its limits and withdraw the spacers therefrom, and operable means controlled through the justifying means for returning the spacers to the spacer magazine when withdrawn from the line.

76. In a typographic machine having means for producing types in any desired order and assembling them into a composed line, a spacer magazine, spacers, means for introducing the spacers into the line, justifying means for advancing the spacers and spreading the line to its limits and withdrawing the spacers therefrom, means to return the spacers to the spacer magazine and a control for the spacer return means actuated when the spacers have been withdrawn from the line.

77. In a typographic machine having means for producing types in any desired order and assembling them into a composed line, a spacer magazine, spacers, means for introducing the spacers into the line, means for advancing and withdrawing the spacers from the line, a spacer return means, means actuating the spacer return means to restore the spacers into the spacer magazine controlled by the means for advancing and withdrawing the spacers.

78. In a machine for producing types in any desired order and assembling them into a composed line, means for effecting the justification of the line, and a line carriage comprising movable jaws actuated by the means which effects the justification of the line.

79. In a machine for producing types in any desired order and assembling them into a composed line, means for effecting the justification of the line, a line carriage comprising stationary and movable jaws normally set in an open position, and means actuating the movable jaws controlled by the means effecting the justification of the line.

80. In a machine for producing types with grooves interjacent their ends and assembling the types into a composed line, means for producing a locking strip, said means having within it a moving element for forming the locking strip and impressing it into the grooved types.

81. In a machine for producing types with grooves interjacent their ends and assembling the types into a composed line, means for producing a locking strip, said means having within it a moving element for forming the locking strip and impressing it into the grooved types, and means for resisting the pressure of the moving element on the locking strip and types.

82. In a machine for producing types with grooves interjacent their ends and assembling them into a composed line, a locking strip producing means having within it a moving element for forming the locking strip and impressing it into the grooved types, said locking strip producing means having an oscillating movement between the position where the locking strip is produced and the position where it is impressed into the types.

83. In a machine for producing types with grooves interjacent their ends to receive a locking strip, in combination, means for assembling the types into a composed line, a melting pot, and a mold for forming the locking strip oscillating between the melting pot and the line, said mold having a moving element within it for forming a locking strip and impressing it into the locking grooves of the types.

84. In a typographic machine, a melting pot, a resisting means, a mold for forming a locking strip, means for causing the oscillation of the mold to bring it alternately into operative relation with the melting pot and the resisting means, and means within and forming part of the mold for ejecting the locking strip when in operative relation with the resisting means.

85. In a typographic machine, means for casting and assembling a plural number of types into a line, a mold for forming a locking strip, means within and forming part of the mold for introducing the locking strip into a line of assembled types, and means to bring the assembled types into operative relation with the mold to receive the locking strip.

86. In a typographic machine, a mold for forming a locking strip, means within and forming part of the mold for introducing the locking strip into a line of assembled types, means to bring the assembled types into operative relation with the mold to receive the locking strip, and means to sustain the thrust on the types during the introduction of the locking strip.

87. In a typographic machine, a mold for forming a locking strip, means within and forming part of the mold for introducing the locking strip into a line of assembled types, means to bring the assembled types into operative relation with the mold to receive the locking strip, a compressor means, and means to move the line to the compressor means.

88. In a typographic machine an amalgamator comprising a stationary member, a pivoted member, opposed to the stationary member a movable member between them, causing during its movements, the action of the pivoted member.

89. In a typographic machine an amalgamator comprising a stationary member, a pivoted member, a movable member between them causing the action of the pivoted member and a compressor member opposed to and coacting with the movable member.

90. In a typographic machine an amalgamator comprising a stationary member, a pivoted member opposed to the stationary member, a movable member operating between the stationary and pivoted members to actuate the pivoted member, a compressor member, and operable means for actuating the compressor member and forcing the movable member inward between the stationary and pivoted members.

91. In a typographic machine an amalgamator comprising a stationary member, a pivoted member opposed to the stationary member, and a movable member between them actuating the pivoted member, the stationary member having a part extending beyond the surface of the pivoted member for alining the faces of the types.

92. In a typographic machine, a compressor to receive the composite line of type, a galley, and an amalgamator, with means to alternately bring the amalgamator into operative relation with the compressor to receive and amalgamate the composite line, and then into operative relation with the galley to deliver it.

93. In a typographic machine, in combination, means for producing types in any desired order with locking grooves intermediate their ends, means for assembling the types into a composed line, means for producing a locking strip and introducing it into the locking grooves of the assembled types, means to aline the faces of the types, and means to compress the locking strip into the locking grooves.

94. In a typographic machine means for casting types in any desired order and assembling them into a line, means to justify the line, a line carriage, a locking strip mold, means within the locking strip mold for introducing the locking strip into the line, means actuating the line carriage to seize the justified line and position it contiguous to the locking strip mold, and means to release the line carriage and return it to its normal position when the locking strip is introduced into the line.

95. In a typographic machine a melting pot, a locking strip mold movable into operative relation with the melting pot for the cast of the locking strip and out of operative relation with the melting pot for the delivery of the locking strip, and means within the mold for forming the locking strip and ejecting it from the mold.

96. In a typographic machine, means for producing types in any desired order and assembling them into a line, a line resistant advanced step by step by the assembly of the types, a supporting member to which the line resistant is pivotally connected, and means for actuating the supporting member to move the line resistant out of the path of the types until the line has been carried away and to then return it to its initial position.

97. In a typographic machine, means for producing types in any desired order and assembling them into a composed line, two line jaws normally positioned clear of the types and set apart to the exact length of line, a line resistant and a supporting member to which the line resistant is pivoted, said supporting member simultaneously raising the line resistant above the assembled types and setting said jaws at the ends of the line.

98. In a typographic machine, means for producing types in any desired order, a type assembler, means for delivering the types to the type assembler in the order of their production, a line resistant comprising two levers to move with the assembling types, and a supporting member to which the line resistant is pivoted.

99. In a typographic machine, in combination means for producing a plural number of types and assembling them into a line, and a mold to form a locking strip to bind the line of types together, comprising an independently movable member within the mold for forming the locking strip and impressing it into the types.

100. In a typographic machine, a mold to form a locking strip to be introduced into a justified and locked line of types grooved to receive the locking strip, comprising an independently movable member within the mold for forming the locking strip and introducing it into the line, means for amalgamating the line, and means for transferring the line to an amalgamating means.

101. In a typographic machine, in combination a melting pot, line supporting means, a mold to cast a locking strip movable between the melting pot and the line supporting means, said mold having a movable part within it to form the locking strip when the mold is in operative relation with the melting pot and to eject the locking strip when the mold is in operative relation with the line supporting means.

102. In a typographic machine an amalgamator comprising a fixed member, a movable member pivoted to the fixed member, means to aline the faces of the types against the fixed member, and means to actuate the pivoted member and move it into operative relation with the fixed member.

103. In a typographic machine an amalgamator comprising a fixed member, an oscillating member pivoted to the fixed member, a movable member operating between the fixed and oscillating members, and means for actuating the movable member to cause the movement of the oscillating member.

104. In a typographic machine an amalgamator comprising a fixed member, an oscillating member pivoted to the fixed member, a movable member between the fixed and oscillating members actuating the oscillating member, and means for moving the amalgamator between a position for receiving a line of types and a position for delivering it to a galley.

105. In a typographic machine, in which the types are delivered from the casting position to a place of type assemblage, a type mold comprising two normally connected mold sides for the casting of the type and its carriage to the place of type assemblage, means causing the two mold sides to move unitedly between the remainder of the mold and the place of type assemblage, and means to deliver the type from the mold sides at the place of type assemblage.

106. In a typographic machine, means for producing types in any desired order and assembling them into a line, a spacer magazine, a spacer having one side beveled, means to eject the spacer from the spacer magazine and introduce it between the types during their assemblage, means to sustain the spacer between the types during the assemblage of the line, and means to form a support for the spacer during its return to the spacer magazine, said spacer having an elongated slot to accommodate the spacer supporting means.

107. In a typographic machine in which the types are delivered from the casting position to a place of type assemblage, a mold for producing types in any desired order comprising a mold side, movable from the remainder of the mold, for the casting of the types and its carriage to the place of type assemblage, means for causing the movement of the movable mold side, and means to strike the type therefrom at the place of type assemblage.

108. In a typographic machine, means for producing types in any desired order, comprising a mold having a movable mold side, means for causing the movement of the movable mold side to the place of type assemblage, means to steady the flight of the movable mold side as it travels to and from the place of type assemblage, and means for striking the type from the mold side at the place of type assemblage.

109. In a typographic machine a mold and an ejector for delivering the type from the mold to a place of assemblage, means to steady the ejector in its flight between the mold and place of assemblage and pawls to separate the type from the ejector at the place of assemblage.

110. In a machine for casting types and assembling them within an assembly chamber in any desired order, in combination, a line carriage, line jaws positioned to determine the length of line and normally clear of the types during the type assemblage, means for actuating the line carriage, means to justify the line and operable means for setting the jaws within the type assembly chamber to sustain the line of types when the line is being justified, the action of the line carriage being controlled by the jaw setting means when restoring the jaws to their initial position.

111. In a typographic machine, having a type assembling chamber, a line resistant movable within the type assembly chamber to sustain the assemblage of the types into a line, a line carriage, means for moving the line carriage, means to remove the line resistant upon the completion of the line and to return it to its initial position for the succeeding line, the movement of the line carriage being controlled by the means which removes the line resistant from the line and returns it to its initial position in the assembly chamber.

112. In a typographic machine, means for producing types and assembling them into a composed line, means to justify the line, a line carriage to seize the justified line and retain it in its justified condition, means for producing a locking strip, means for transferring the line carriage with the justified line to the locking strip producing means, means for introducing the locking strip into the justified line, and means for compressing the locking strip into the justified line.

113. In a typographic machine in which the types are delivered from the casting position to a place of type assemblage, a type body mold comprising a movable mold side and an ejector connected to the movable side for the carriage of the types to the place of assemblage.

114. In a typographic machine in which the types are delivered from the casting position to a place of type assemblage, a type body mold comprising a movable mold side and an ejector slidably connected to the movable mold side for the carriage and delivery of the types to the place of assemblage.

115. In a typographic machine, a type body mold having a movable mold side with a dove tail core, and an ejector having a dove tail groove to receive the dove tail core, whereby the ejector and mold side are slidably connected to move unitedly to the place of type assemblage and to permit of the movement of the ejector when the mold side is arrested.

116. In a typographic machine, in combination, a mold comprising an ejector having a rib lengthwise of its top surface raised to or above the level of the type, and a cross rib at its free end raised to the same level as the lengthwise rib, means engaging the lengthwise rib during the flight of the ejector to and from the place of type assemblage, pawls effecting the separation of the type from the ejector into the assembling line, and lugs for the pawls engaging the cross rib to raise the pawls clear of the type as the ejector moves to the delivery position.

117. In a typographic machine, in combination, a mold, a type assembler consisting of two lower rails, two upper rails separated from the lower rails, and false rails yieldingly held by the upper rails to frictionally hold the type, and means to deliver the type to the type assembler from the mold.

118. In a typographic machine, in combination, means for casting and assembling a plural number of types into a line, a line resistant for the assembling types advanced step by step as the types are introduced into the lines, and means for retarding the line resistant and holding it in contact with the line, means to justify the line, and means to simultaneously actuate the justifying means and remove the line resistant from the path of the line.

119. In a typographic machine, in combination, means for casting and assembling a plural number of types into a line, a line resistant for the assembling types advanced step by step as the types are introduced into the line, said line resistant consisting of two levers pivotally connected at one end and having a line resisting member at the other end to move with the assembling line, and means to retard the action of the line resistant during its advance with the assembling types when introduced into the line.

120. In a typographic machine, means for casting types, means for assembling them into a line, means for justifying the line, and a locking control for the justifying means until the justification of the line is completed.

121. In a machine for producing individual types and assembling them into a composed line, means for effecting the justification of the line, means for locking the types in their justified condition, and a control therefor actuated by the means which effects the justification of the line.

122. In a typographic machine, means for casting types, means for assembling them into a line, means to justify the line, a line carriage to seize the justified line, line jaws set apart to the exact length of line and normally positioned clear of the types during the type assemblage, means for setting the line jaws to engage the ends of the line during justification, and means for actuating the line carriage to remove the justified line from the place of type assemblage.

123. In a typographic machine, means for casting types, means for assembling them into a line, means for justifying the line, means for locking the line in its justified condition, and a locking control for the justifying means until the justification of the line is effected and the line is locked in its justified condition.

124. In a typographic machine, means for casting types, means for assembling them into a line, means for justifying the line, and a locking control for the justifying means until its limit of motion has been attained.

125. In a typographic machine, means for assembling a line of types, two jaws set apart to the exact length of line and normally clear of the types, a line resistant normally in the path of the line, and means for simultaneously setting the jaws at ends of the line and removing the line resistant therefrom.

126. In a typographic machine, means for casting types, means for assembling them into a line, means for determining the length of line normally positioned clear of the path of the types, a line resistant normally positioned in the path of the types and advanced step by step with the assembling line, means for justifying the line, and means for setting the line determining means at the ends of the line and removing the line resistant therefrom.

127. In a typographic machine, means for assembling a line of types, means for determining the length of line normally positioned clear of the path of the types, a line resistant normally positioned in the path of the types and advanced step by step with the assembling line, means for spacing the line, and means, setting the line determining means at the ends of the line, removing the line resistant therefrom, and advancing the spacing means to spread the types to the line determining means.

128. In a typographic machine, means for casting and assembling a line of types, a spacer magazine, spacers, means to introduce the spacers into the assembling line, justifying means to advance the spacers and spread the line to its limits and withdraw the spacers therefrom, means for returning the spacers to the spacer magazine, and a control for the spacer returning means released by the justifying means when restored to a normal position.

129. In a typographic machine, means for casting and assembling a line of types, a spacer magazine, spacers, means for introducing the spacers into the line, justifying means for advancing the spacers and spreading the line to its limits and withdrawing the spacers therefrom, means to return the spacers to the spacer magazine, and a control for the spacer return means released by the justifying means when the spacers have been withdrawn from the line and the justifying means has been restored to a normal position.

130. In a typographic machine, means for casting and assembling a line of types, a spacer magazine, spacers, means for introducing the spacers into the line, justifying means for advancing the spacers to spread the line to its limits and withdrawing them therefrom, means to return the spacers to the spacer magazine a control for the spacer return means released by the justifying means when the spacers have been withdrawn from the line and the justifying means has been restored to a normal position, and means to restore the spacer return means to a normal position.

131. In a typographic machine, means for producing types with grooves interjacent their ends and assembling them into a composed line, and means for producing a locking strip, said means having within it a moving element for introducing the locking strip into the grooved types.

132. In a typographic machine, means for producing types with grooves interjacent their ends and assembling them into a composed line, means for producing a locking strip, said means having within it a moving element for impressing the locking strip into the grooved types, and means for resisting the pressure of the moving element on the types.

133. In a typographic machine, means for producing types with grooves interjacent their ends and assembling them into a composed line, a locking strip producing means having within it a moving element for impressing the locking strip into the grooved types, said locking strip producing means having an oscillating movement between the position where the locking strip is produced and the position where it is impressed into the types.

134. In a typographic machine, means for producing types with grooves interjacent their ends to receive a locking strip, means for assembling the types into a composed line, a melting pot, and a locking strip mold oscillating between the melting pot and the line, said mold having a moving element for impressing the locking strip into the grooved types.

135. In a typographic machine, a melting pot, resisting means, a locking strip mold, means for causing the oscillation of the mold to bring it alternately into operative relation with the melting pot and the resisting means, and means within and forming part of the mold for ejecting the locking strip when in operative relation with the resisting means.

136. In a typographic machine, means for casting and assembling a line of types, a locking strip mold, means within and forming part of the mold for introducing the locking strip into the line, and means to bring the line into operative relation with the mold to receive the locking strip.

137. In a typographic machine, means for assembling a line of types, a locking strip mold, means within and forming part of the mold for introducing the locking strip into the line, means to bring the line into operative relation with the mold to receive the locking strip, and means to resist the pressure on the line during the introduction of the locking strip.

138. In a typographic machine, means for assembling a line of types, a locking strip mold, means within and forming part of the mold for introducing the locking strip into the line, means to bring the line into operative relation with the mold to receive the locking strip, a compressor, and means to move the line to the compressor.

139. In a typographic machine an amalgamator comprising a stationary member, a pivoted member, a movable member causing the action of the pivoted member, and a compressor opposed to and co-acting with the movable member.

140. In a typographic machine an amalgamator comprising a stationary member, a pivoted member opposed to the stationary member, a movable member operating between the stationary and pivoted members and actuating the pivoted member, a compressor, and operable means for actuating the compressor.

141. In a typographic machine, an amalgamator comprising a stationary member, a pivoted member opposed to the stationary member, and a movable member between them actuating the pivoted member, the stationary member having a part extending beyond the pivoted member for alining types.

142. In a typographic machine, a compressor, a galley, and an amalgamator, with means to alternately bring the amalgamator into operative relation with the compressor and the galley.

143. In a typographic machine, means for producing types in any desired order, with locking grooves intermediate their ends, means for assembling them into a composed line, means for producing a locking strip comprising a moving element for introducing it into the locking grooves of the assembled types, and means to compress the locking strip into the grooved types.

144. In a typographic machine, means for casting grooved types and assembling them into a line, means to justify the line, a locking strip mold, a line carriage to position the justified line contiguous to the locking strip mold, means within the mold for introducing the locking strip into the grooved types, and means to return the line carriage to its normal position.

145. In a typographic machine, a melting pot, a locking strip mold movable into operative relation with the melting pot for casting the locking strip and out of operative relation with the melting pot for the delivery of the locking strip, and means within and forming part of the mold for casting and ejecting the locking strip.

146. In a typographic machine, means for producing types and assembling them into a line, a line resistant advanced step by step during the assembly of the types, a supporting member to which the line resistant is pivotally connected, and means for actuating the supporting member to remove the line resistant from operative relation with the types until the line has been removed and to then return the line resistant to its initial position.

147. In a typographic machine, means for producing types and assembling them into a composed line, two line jaws normally positioned clear of the types and set apart to the exact length of line, a line resistant, and operable means to move the line resistant into and out of operative relation with the line, said operable means having a sliding connection with the line jaws to set them at opposite ends of the line as the line resistant is removed from operative relation with the line.

148. In a typographic machine, means for producing types, means for assembling them into a line, means for delivering the types to the type assembling means, a line resistant advanced step by step with the assembling types, and a supporting member to which the line resistant is pivoted.

149. In a typographic machine, means for assembling a line of types, and a mold to form a locking strip to bind the line of types together, said mold having a movable member within it for impressing the locking strip into the line, and means to support the line while the locking strip is being impressed into the types.

150. In a typographic machine, means for assembling a line of types and a mold to cast a locking strip for binding the types together, said mold having within it a movable member for introducing the locking strip into the line of types, means for amalgamating together the locking strip and line of types, and means for transferring the line of types to the amalgamating means.

151. In a typographic machine, a melting pot, a line carriage, a mold to cast a locking strip movable alternately into operative relation with the melting pot and the line carriage, said mold having a movable part retracted within it when the mold is in operative relation with the melting pot and actuated to eject the locking strip when the mold is in operative relation with the line carriage.

152. In a typographic machine, an amalgamator comprising a fixed member, a member pivoted to the fixed member, means actuating the pivoted member to move it into and out of operative relation with the fixed member, and means forming part of the fixed member to aline the faces of the types.

153. In a typographic machine, an amalgamator comprising a fixed member, a member pivoted to the fixed member, a movable member operating between the fixed and pivoted members, and means actuating the movable member to bring the pivoted member into and out of operative relation with the fixed member.

154. In a typographic machine, an amalgamator comprising a fixed member, a member pivoted to the fixed member, a movable member operating between the fixed and pivoted members to actuate the pivoted member, and means for moving the amalgamator between a position for receiving a line of types and a position for delivering it.

155. In a typographic machine, in which the types are delivered from the casting position to a place of type assemblage, means for assembling a line of types, a type mold comprising two normally connected mold parts for the casting of type and its carriage to the type assembling means, means causing the two mold parts to move unitedly to and from the casting position, and means to separate the type from the mold parts for delivery to the type assembling means.

156. In a typographic machine, means for producing types and assembling them into a line, a spacer magazine, a spacer having one side beveled, means to eject the spacer from the spacer magazine and introduce it between the types during their assemblage, means to retain the spacer between the types during the assemblage of the line, and means to support the spacer during its return to the spacer magazine, said spacer having an elongated slot to accommodate the spacer supporting means.

157. In a typographic machine in which the types are delivered from the casting position to a place of type assemblage, means for composing and assembling a line of types, a mold for casting types comprising a mold part movable to and from the casting position for the carriage of the types to the assembling means, means for causing the movement of the movable mold part, and means to separate the types from the movable mold part and deliver them to the assembling means.

158. In a typographic machine in which the types are delivered from the casting position to a place of type assemblage, means for composing and assembling a line of types, a mold for casting types comprising a mold part movable from the casting position to the place of type delivery, means for causing the movement of the mold part, means to steady the mold part during its movement, and means for separating the types from the mold part at the place of delivery.

159. In a typographic machine, means for casting types and assembling them into a line, means to justify the line, a line carriage to seize the justified line, line jaws set apart to the length of line and positioned normally clear of the types during the type assemblage, means for setting the jaws to engage the ends of the line during its justification, and means for actuating the line carriage to remove the justified line from the place of type assemblage.

160. In a typographic machine, means for assembling a line of types, a line resistant having operative relation with the line assembling means, means for moving the line resistant to an inoperative position, means for justifying the line, a line carriage, movable jaws for the line carriage to lock the line in its justified condition, and a control for the line carriage jaws released when the justification of the line is effected.

161. In a typographic machine, means for producing types, means to assemble them into a composed line, means to justify the line, a line carriage to seize the justified line and retain it in its justified condition, means for producing a locking strip, means for transferring the line carriage with the justified line to the locking strip producing means, means for introducing the locking strip into the justified line, and means for compressing the locking strip and types together.

162. In a typographic machine, means for casting types, means for assembling them into a line in the order of their production, means for justifying the line, a line carriage for locking the line in its justified condition, and a locking control for the justifying means until the justification of the line is effected and the line is locked in its justified condition.

163. In a typographic machine, means for casting and assembling a line of types, means for justifying the line, means for actuating the justifying means, a line carriage actuated by the justifying means to lock the types in their justified condition, and a locking control for the justifying means until it has actuated the line carriage and reached its limit of motion.

164. In a typographic machine, means for producing and assembling a line of types, means for producing a locking strip and combining it with the line, and an amalgamator in which the line of types and locking strip are compressed together, having within it a moving part against which the line is compressed, said moving part operating to eject the line from the amalgamator after the line is compressed.

165. In a typographic machine, means for producing and assembling a line of types, means for producing a locking strip and combining it with the line, and an amalgamator in which the line of types and locking strip are compressed together, having an oscillating motion between the place where it receives the line and the place of delivery, and having within it a moving part against which the line is compressed, said moving part operating to eject the line from the amalgamator at the place of delivery.

166. In a typographic machine, means for assembling and justifying a line of types, means for producing a locking strip and combining it with the justified line, and a control therefor preventing the subsequent operation of the justifying means until the locking strip producing means has completed its cycle of motion and come to a normal position.

167. In a typographic machine, means for assembling and justifying a line of types, means for producing a locking strip and combining it with the justified line, means for carrying the line of types from the assembling and justifying means to the locking strip producing means, and a control therefor preventing the subsequent action of the justifying means until the line carrying means and the locking strip producing means have completed their cycle of motion and returned to a normal position.

168. In a typographic machine, means for assembling a line of types, means for justifying the line, a line carriage for removing the justified line from the place of type assemblage, means for producing a locking strip and combining it with the justified line, means for compressing the locking strip and justified line together, and a control therefor preventing the subsequent operation of the justifying means until the line carriage, the locking strip producing means, and the compressing means have completed their cycle of motion.

169. In a typographic machine, means for producing and assembling a line of types, a spacer magazine, spacers normally stored in the spacer magazine, means for introducing the spacers from the spacer magazine into the assembling line, a justifying element for advancing the spacers between the types and withdrawing them from the line, and a control therefor preventing the subsequent operation of the justifying element until the spacers have been restored to the spacer magazine.

170. In a typographic machine in which a line of types is locked together by a locking strip, means for casting and assembling a line of types, means for justifying the line, means for casting a locking strip and combining it with the assembled types, means for pressing the justified line and locking strip together, and means for actuating the compressing means, set in motion by the operation of the justifying means when restored to a normal position.

171. In a typographic machine in which a line of types is locked together by a locking strip, means for casting and assembling a line of types, means for justifying the line, a mold for casting a locking strip having within it a moving part for combining the locking strip with the assembled types, and means for compressing the types and locking strip together controlled by the action of the justifying means when actuated and restored to a normal position.

172. A typographic machine, comprising means for casting types, means for assembling them into line, spacers, means to introduce the spacers between the assembling types, a justifying element for advancing the spacers to spread the line to its limits and withdrawing them therefrom, means for returning the spacers to a position of rest when withdrawn from the line, means for casting a locking strip and combining it with the assembled types, and means for compressing the types and locking strip together, controlled by the action of the spacer return means.

173. In a typographic machine, means for casting types, means for assembling them into a line, spacers, means to introduce the spacers between the assembling types, a justifying element for advancing the spacers to spread the line to its limits and withdrawing them therefrom, and a locking control for the justifying element until its limit of motion has been attained.

174. In a typographic machine, means for casting types, means for assembling them into a line, spacers, means to introduce the spacers between the assembling types, a justifying element for advancing the spacers to spread the line to its limits and withdrawing them therefrom, means for returning the spacers to a position of rest, means for casting a locking strip and combining it with the assembled types and means for compressing said locking strip and the types together, set in motion when the spacer return means has attained its limit of motion.

175. In a typographic machine, comprising means for casting types, means for assembling them into a line, spacers, means to introduce the spacers between the assembling types, means to advance the spacers for the justification of the line and then withdraw them therefrom, in combination, means for returning the spacers to a position of rest when withdrawn from the line, a locking strip mold for producing a locking strip, means for compressing together the locking strip and the types, a shaft from which the action of the locking strip mold and compressing means is taken, and a clutch for the shaft set by the spacer return means when it has returned the spacers to a position of rest.

176. In a typographic machine, means for casting types and assembling them into a line, means for justifying the line, a starting handle connected with the justifying means, and means controlling the action of the justifying means and starting handle until the justifying means has completed the justification of the line.

177. In a typographic machine, means for casting types, means for assembling them into a line, spacers, means to introduce the spacers between the assembling types, a justifying element for advancing the spacers to spread the line to its limits and withdrawing them therefrom, means for returning the spacers to a position of rest when withdrawn from the line, and a locking control for the justifying element until it has effected the justification of the line.

178. In a typographic machine, means for casting types, means for assembling them into a line, spacers, means to introduce the spacers between the assembling types, a justifying element for advancing the spacers to spread the line to its limits and withdrawing the spacers therefrom, actuating means for the justifying element, and mechanically controlled means for returning the spacers to a position of rest automatically actuated by the justifying element when returned to a normal position.

179. In a typographic machine, means for casting types, means for assembling them into a line, means for justifying the line, and means for producing a locking strip and combining it with the justified line automatically actuated when the justifying means has been returned to a normal position.

180. In a typographic machine, means for casting types, means for assembling them into a line, means for justifying the line, means for casting a locking strip and combining it with the justified line, means for compressing the justified line and a locking strip together, and means for actuating the compressing means automatically actuated when the justifying means has been returned to a normal position.

181. In a typographic machine in which a line of types are locked together by a locking strip, means for casting types, means for assembling them into a line, means for justifying the line, and means for combining a locking strip with the justified line automatically actuated when the justifying means has been returned to a normal position.

182. In a typographic machine in which a line of types are locked together by a locking strip, means for casting types, means for assembling them into a line, means for justifying the line, spacers, means to introduce the spacers between the assembling types and advance them to justify the line and then withdraw them therefrom, means to return the spacers to a position of rest, and means to combine a locking strip with the justified line, actuated when the spacer return means has attained its limit of motion.

183. In a typographic machine in which a line of types are locked together by a locking strip, means for casting types, means for assembling them into a line, means for justifying the line, spacers, means to introduce the spacers between the assembling types, means to advance the spacers to justify the line, means for producing a locking strip and combining it with the justified line, means for actuating the locking strip producing means, and spacer return means controlling the action of the locking strip producing means.

184. A typographic machine, comprising means for casting types, means for assembling them into a line, spacers, means to introduce the spacers between the assembling types, means to advance the spacers for the justification of the line and then withdraw them therefrom, means for returning the spacers to a position of rest when withdrawn from the line, a locking strip mold for producing a locking strip and combining it with the justified line, and a shaft from which the action of the locking strip mold is taken controlled by the spacer return means.

185. A typographic machine, comprising means for casting types, means for assembling them into a line, spacers, means to introduce the spacers between the assembling types, means to advance the spacers for the justification of the line and then withdraw them therefrom, means for returning the spacers to a position of rest when withdrawn from the line, a locking strip mold for producing a locking strip and combining it with the justified line, and a line carriage to transfer the justified line from the assembling means to the locking strip mold controlled by the action of the spacer return means.

186. A typographic machine, comprising means for casting types, means for assembling them into a line, spacers, means to introduce the spacers between the assembling types, means to advance the spacers for the justification of the line and then withdraw them therefrom, means for returning the spacers to a position of rest when withdrawn from the line, means for producing a locking strip and combining it with the justified line, and means for compressing the justified line and a locking strip together controlled by the spacer return means until it has returned the spacers to a position of rest.

187. A typographic machine, comprising means for casting types, means for assembling them into a line, spacers, means to introduce the spacers between the assembling types, means to advance the spacers for the justification of the line and then withdraw them therefrom, means for returning the spacers to a position of rest when withdrawn from the line, a locking strip mold for producing a locking strip and combining it with the justified line, means for compressing the justified line and locking strip together, and a shaft from which the action of the locking strip mold and compressing means is taken set in motion by the spacer return means when it has returned the spacers to a position of rest.

188. A typographic machine, comprising means for casting types, means for assembling them into a line, spacers, means to introduce the spacers between the assembling types, means to advance the spacers for the justification of the line and then withdraw them therefrom, means for returning the spacers to a position of rest when withdrawn from the line, a locking strip mold for producing a locking strip and combining it with the justified line, means for compressing the justified line and locking strip together, a shaft from which the action of the locking strip mold and compressing means is taken, and a clutch for the shaft set by the spacer return means when it has returned the spacers to a position of rest.

189. In a typographic machine, comprising means for casting types, means for assembling them into a line, spacers, means to introduce the spacers between the assembling types, a justifying element for advancing the spacers to spread the line to its limits and withdrawing them therefrom, means for returning the spacers to a position of rest when withdrawn from the line, a starting handle actuating the justifying element, and a shaft, set in motion by the spacer return means when it has returned the spacers to a position of rest, said shaft being provided with means to prevent the subsequent action of the starting handle until the shaft has completed its revolution and come to a normal position.

In testimony whereof I have hereunto set my hand in presence of two subscribing witnesses.

ERNEST BENJAMIN BARBER.

Witnesses:
CHARLES H. RICHES,
CECILIA HANSEN.

Copies of this patent may be obtained for five cents each, by addressing the "Commissioner of Patents, Washington, D. C."